United States Patent
Guan et al.

(10) Patent No.: US 10,075,073 B2
(45) Date of Patent: Sep. 11, 2018

(54) DC/DC CONVERTER AND SWITCHING POWER SUPPLY HAVING OVERCURRENT PROTECTION

(71) Applicant: Rohm Co., Ltd., Kyoto (JP)

(72) Inventors: Shidong Guan, Kyoto (JP); Takatsugu Wachi, Kyoto (JP); Yoshio Higashida, Kyoto (JP); Takehiro Yoshida, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 9 days.

(21) Appl. No.: 15/259,154

(22) Filed: Sep. 8, 2016

(65) Prior Publication Data

US 2017/0070149 A1    Mar. 9, 2017

(30) Foreign Application Priority Data

Sep. 8, 2015 (JP) .................... 2015-176689
Sep. 16, 2015 (JP) .................... 2015-182596
Sep. 16, 2015 (JP) .................... 2015-182597
Aug. 9, 2016 (JP) .................... 2016-156485

(51) Int. Cl.
*H02M 3/158* (2006.01)
*H02M 1/36* (2007.01)
*H02M 1/32* (2007.01)
*G05F 1/46* (2006.01)
*H02M 1/00* (2006.01)

(52) U.S. Cl.
CPC .............. *H02M 3/158* (2013.01); *G05F 1/46* (2013.01); *H02M 1/32* (2013.01); *H02M 1/36* (2013.01); *H02M 2001/0009* (2013.01)

(58) Field of Classification Search
CPC ..................................................... H02M 3/158
See application file for complete search history.

(56) References Cited

U.S. PATENT DOCUMENTS

| | | | |
|---|---|---|---|
| 2008/0238395 A1 | 10/2008 | Hasegawa | |
| 2010/0067152 A1* | 3/2010 | Nakahashi | H02M 1/32 361/18 |
| 2011/0187339 A1* | 8/2011 | Trattler | H02M 3/156 323/283 |
| 2011/0279153 A1* | 11/2011 | Zhu | H02M 7/53803 327/131 |
| 2012/0049829 A1 | 3/2012 | Murakami | |
| 2012/0126772 A1 | 5/2012 | Yamakoshi et al. | |
| 2013/0234682 A1* | 9/2013 | Yoon | G05F 1/625 323/234 |
| 2015/0244265 A1* | 8/2015 | Sugahara | H02M 1/36 323/273 |

FOREIGN PATENT DOCUMENTS

| | | |
|---|---|---|
| JP | 2006-288054 | 10/2006 |
| JP | 2008-245431 | 10/2008 |
| JP | 2012-114987 | 6/2012 |
| JP | 2013-21816 | 1/2013 |
| WO | 2010/134516 | 11/2010 |

\* cited by examiner

*Primary Examiner* — Kyle J Moody
*Assistant Examiner* — Trinh Q Dang
(74) *Attorney, Agent, or Firm* — Fish & Richardson P.C.

(57) ABSTRACT

A DC/DC converter has: a soft-start circuit, a variable output current generator, a constant current source, an oscillator, a slope circuit, a PWM comparator, and a control circuit operable to turn ON and OFF first and second transistors alternately based on a pulse width modulation signal. Through the switching operation of the first and second transistors, an input voltage is converted into a output voltage.

32 Claims, 29 Drawing Sheets

DC/DC CONVERTER AND SWITCHING POWER SUPPLY HAVING OVERCURRENT PROTECTION

CROSS-REFERENCE TO RELATED APPLICATIONS

This application is based on the following Japanese patent applications, the contents of all of which are hereby incorporated by reference:

(1) Japanese Patent Application filed as No. 2015-176689 (on Sep. 8, 2015)
(2) Japanese Patent Application filed as No. 2015-182596 (on Sep. 16, 2015)
(3) Japanese Patent Application filed as No. 2015-182597 (on Sep. 16, 2015)
(4) Japanese Patent Application filed as No. 2016-156485 (on Aug. 9, 2016)

BACKGROUND OF THE INVENTION

1. Field of the Invention

The present invention relates to DC-DC converters including a soft-start circuit for use in switching power supplies, and to switching power supplies.

2. Description of Related Art

First Conventional Technology:

DC-DC converters including a soft-start circuit are used in electronic appliances, OA (office automation) appliances, etc. When an electronic appliance or the like starts up, the provision of a soft-start circuit prevents an overshoot in the output voltage of a DC-DC converter, and prevents malfunction of the electronic appliance or the like. It also prevents a rush current that may occur when the electronic appliance or the like starts up.

Japanese Patent Application published as No. 2012-114987 (hereinafter referred to as Patent Document 1) discloses a current-mode synchronous-rectification DC-DC converter including a soft-start circuit. During the soft-start period of the DC-DC converter, oscillation is started at a frequency lower than in the steady state, and the oscillation frequency is then increased gradually; this helps suppress fluctuation of the output voltage that tends to occur while the reference voltage is low, and makes it possible to bring the output voltage into a stable state more quickly.

Japanese Patent Application published as No. 2008-245431 (hereinafter referred to as Patent Document 2) discloses a DC-DC converter that achieves soft-start operation at start-up through digital control. The soft-start circuit disclosed in Patent Document 2 includes a frequency divider, an accumulator, and a DA (digital-to-analog) converter. The frequency divider divides the frequency of a frequency signal to output a frequency-divided signal. The accumulator operates based on a control signal fed from a CPU (central processing unit) and the frequency-divided signal. The DA converter generates a soft-start signal based on the output of the accumulator. This makes it possible to perform soft-start operation at start-up with no change in circuit configuration.

Japanese Patent Application published as No. 2006-288054 (hereinafter referred to as Patent Document 3) discloses a soft-start circuit that alleviates an overshoot in the output voltage by increasing the reference voltage stepwise with a counter at the start-up of a switching DC-DC converter.

Second Conventional Technology:

Conventionally, many switching power supply devices are provided with an overcurrent protection circuit that, on detecting an overcurrent, forcibly stops the switching operation of an output transistor. As overcurrent protection circuits, those of a pulse-by-pulse type are common, which repeat forcible suspension and self-recovery of switching operation every period. To cope with short-circuiting of the output to ground (short-circuiting to GND), in which case the overcurrent cannot be suppressed in time even with the ON-period of the output transistor reduced to the minimum value, there has also been proposed a technique of prolonging the forcible suspension period of switching operation by lowering the switching frequency with a view to enhancing the overcurrent suppression function of the pulse-by-pulse type configuration.

One example related to the conventional technology mentioned above is seen in WO 2010/134516.

Third Conventional Technology:

Conventionally, switching power supply devices that perform PWM (pulse width modulation) control of an output transistor based on the result of comparison between an error voltage and a slope voltage are used in various applications. The lighter the load (i.e., the lower the load current), the lower the error voltage, and thus the lower the ON-duty of the output transistor. Accordingly, some conventional switching power supply devices are provided with a function of stopping the switching operation of the output transistor during a period in which the error voltage is lower than the offset level of the slope voltage.

One example related to the conventional technology mentioned above is seen in Japanese Patent Application published as No. 2013-021816.

First Problem:

According to Patent Document 1, a reference voltage generator is provided which makes a reference voltage increase gradually at start-up and which keeps the reference voltage constant in steady operation. A reference voltage generator like this requires a complicated circuit configuration.

According to Patent Document 2, an overshoot is alleviated by dividing the frequency of a frequency signal with a frequency divider. However, when the frequency is switched, an overshoot occurs in the output voltage. Moreover, the use of the frequency divider results in a complicated circuit configuration.

According to Patent Document 3, an overshoot is alleviated by making a reference voltage increase stepwise with a counter. However, making the reference voltage increase stepwise produces not small overshoots. Moreover, the use of the counter results in a complicated circuit configuration.

Thus, an object of the present invention is to provide a DC-DC converter including a soft-start circuit that can satisfactorily suppress an overshoot in the output voltage at start-up without unduly complicating the circuit configuration.

Second Problem:

As for the second conventional technology, if the above-mentioned function of switching the switching frequency is introduced into a step-up switching power supply device of which the output voltage rises from the GND level, the switching of the switching frequency occurs right while the output voltage is rising. This inconveniently results in increased output ripples at start-up.

In view of the above-discussed problems encountered by the present inventors, another object of the present invention disclosed herein is to provide a switching power supply device that can enhance the overcurrent suppressing function of the pulse-by-pulse type configuration without increasing output ripples at start-up.

Third Problem:

As for the third conventional technology, in conventional switching power supply devices, the offset level of a slope voltage is fixed. This inconveniently results in the magnitude of the load current at the time of switching to a light-load mode varying depending on input/output settings (the difference between the input voltage and the output voltage).

In view of the above-discussed problems encountered by the present inventors, yet another object of the present invention disclosed herein is to provide a switching power supply device that can reduce variation of the load current at the time of switching to a light-load mode.

SUMMARY OF THE INVENTION

Means for Solving the First Problem:

A DC-DC converter including a soft-start circuit according to the present invention includes: a soft-start circuit which generates a soft-start input voltage that increases gradually; an error amplifier which generates an error signal by comparing an output voltage generated at an output terminal or a feedback voltage having a predetermined relationship with the output voltage with whichever is lower of a reference voltage and the soft-start input voltage; a variable output current generator which receives the soft-start input voltage or a soft-start output voltage having a predetermined relationship with the soft-start input voltage and which generates a variable output current that is proportional to the soft-start input voltage or the soft-start output voltage; a constant-current source which generates a bias current; an oscillator which generates a rectangular-wave signal whose frequency varies linearly with a soft-start current which is the sum of the variable output current and the bias current; a slope circuit which generates a slope signal based on the rectangular-wave signal; a PWM comparator which generates a pulse-width modulated signal based on the error signal and the slope signal; and a control circuit which turns ON and OFF a first transistor and a second transistor alternately based on the pulse-width modulated signal. Here, the first and second transistors perform switching operation and thereby convert an input voltage, which is applied to a high-potential terminal, into the output voltage, which is then output from the output terminal, such that the output voltage has a predefined voltage value.

Means for Solving the Second Problem:

A switching power supply device disclosed herein includes: a switching output stage which generates an output voltage by stepping down an input voltage; an error amplifier which receives input of the output voltage or a feedback voltage commensurate therewith and which generates an error voltage; an oscillation circuit which generates an ON signal at a switching frequency; a slope voltage generation circuit which generates a slope voltage in synchronism with the ON signal; a comparison circuit which generates an OFF signal by comparing the error voltage with the slope voltage; a logic circuit which generates an ON/OFF control signal according to the ON signal and the OFF signal; a driver circuit which drives the switching output stage according to the ON/OFF control signal; and an overcurrent protection circuit of a pulse-by-pulse type which forcibly stops switching operation of the switching output stage on detecting an overcurrent passing through the switching output stage. Here, the oscillation circuit has the function of varying the switching frequency according to the output voltage or the feedback voltage, and the slope voltage generation circuit has the function of varying the gradient of the slope voltage according to the switching frequency.

Means for Solving the Third Problem:

A switching power supply device disclosed herein include: a switching output stage which generates an output voltage from an input voltage by use of an output transistor; an error amplifier which receives input of the output voltage or a feedback voltage commensurate therewith and which generates an error voltage; an oscillation circuit which generates a pulse in an ON signal at a predetermined switching frequency; a slope voltage generation circuit which generates a slope voltage in synchronism with the ON signal; a comparison circuit which generates an OFF signal by comparing the error voltage with the slope voltage; a logic circuit which generates an ON/OFF control signal according to the ON signal and the OFF signal; and a driver circuit which drives the switching output stage according to the ON/OFF control signal. Here, the slope voltage generation circuit adjusts the offset level of the slope voltage such that the slope voltage follows the equilibrium level of the error voltage.

Other features, elements, steps, benefits, and characteristics of the present invention will become clear from the following description of preferred embodiments taken in conjunction with the accompanying drawings.

DETAILED DESCRIPTION OF PREFERRED EMBODIMENTS

First Embodiment

A first embodiment of the present invention will be described below with reference to the relevant drawings.

Figure 1:
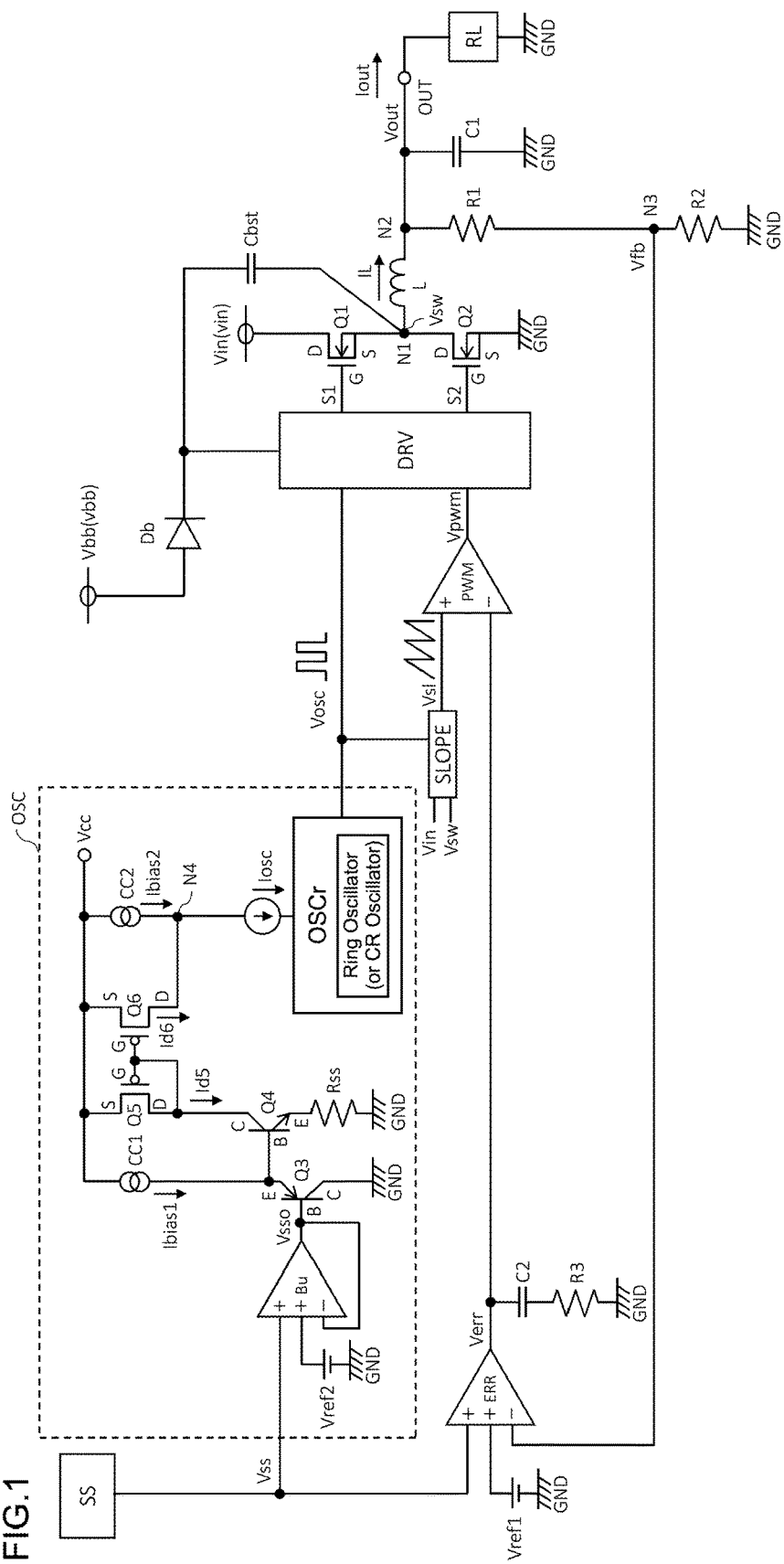
FIG. 1 is a circuit diagram of a DC-DC converter including a soft-start circuit according to a first embodiment of the present invention.

FIG. 1 is a circuit diagram of a DC-DC converter including a soft-start circuit according to a first embodiment of the present invention. The DC-DC converter in FIG. 1 is a synchronous-rectification step-down DC-DC converter.

In FIG. 1, the DC-DC converter is composed of a control circuit DRV, a first transistor Q1, a second transistor Q2, an inductor L, a capacitor C1, a capacitor C2, resistors R1 to R3, an error amplifier ERR, a slope circuit SLOPE, a PWM comparator PWM, a soft-start circuit SS, and an oscillation circuit OSC. The inductor L has an inductance of, for example, 0.47 μH to 47 μH. The capacitor C1 has a capacitance of, for example 10 μF to 1000 μf. The capacitor C2 has a capacitance of, for example 1000 pF to 10 nF. The resistor R3 has a resistance of, for example, 1 kΩ to 200 kΩ.

The first and second transistors Q1 and Q2 are both NMOS transistors (N-channel metal-oxide-semiconductor field-effect transistors); instead, the first transistor Q1 may be a PMOS transistor (p-channel metal-oxide-semiconductor field-effect transistor) while the second transistor Q2 is an NMOS transistor. In a case where an NMOS transistor is used as the first transistor Q1, a bootstrap circuit is used which includes a supplied-power terminal Vbb, a diode Db, and a capacitor Cbst. The bootstrap circuit permits the first transistor Q1 to be turned ON reliably. The capacitor Cbst has a capacitance of, for example, 100 nF to 1 μF. As the first and second transistors Q1 and Q2, instead of MOS transistors, even bipolar transistors may be used.

The control circuit DRV turns the first and second transistors Q1 and Q2 ON and OFF complementarily through pulse width modulation control (PWM control). Here, "complementarily" is assumed to cover not only operation where the ON/OFF states of the first and second transistors Q1 and Q2 are completely reversed but also operation where transition of the first and second transistors Q1 and Q2 between the ON/OFF states takes place with a predetermined delay relative to each other, that is, with a dead time inserted, with a view to preventing a through current.

The oscillation circuit OSC includes a buffer Bu, a resistor Rss, a third to a sixth transistor Q3 to Q6, a constant-current source CC1, a constant-current source CC2, and an oscillator OSCr. The oscillator OSCr is configured as, for example, a ring oscillator, where inverters or differential amplifiers are connected in a ring-shaped array, or a CR oscillator.

Next, the circuit configuration of, and the component interconnection in, the DC-DC converter including the soft-start circuit in FIG. 1 will be described.

A first output terminal of the control circuit DRV is connected to a gate G of the first transistor Q1. A second output terminal of the control circuit DRV is connected to a gate G of the second transistor Q2. A drain D of the first transistor Q1 is connected to a supplied-power terminal (high-potential terminal) Vin. A source S of the first transistor Q1 is connected to a node N1. A drain D of the second transistor Q2 is connected to the node N1. A source S of the second transistor Q2 is connected to a ground terminal (low-potential terminal) GND. The inductor L is connected between the node N1 and a node N2. The capacitor C1 is connected between the node N2 and the ground terminal GND. The inductor L and the capacitor C1 constitute a smoothing circuit. The node N2 is connected to an output terminal OUT. To the output terminal OUT, a load RL is connected. Connected as the load RL is, for example, a CPU. The output current Iout that passes through the output terminal OUT is, for example, 0 A to 20 A. The voltage vin at the supplied-power terminal Vin is, for example, 2.7 V to 100 V. The output voltage Vout output to the output terminal OUT is, for example, 0.6 V to 100 V.

The capacitor Cbst is connected between the node N1 and a cathode of the diode Db. An anode of the diode Db is connected to the supplied-power terminal Vbb. The anode of the diode Db is connected to a third input terminal of the control circuit DRV. The capacitor Cbst, the diode Db, and the supplied-power terminal Vbb constitute a bootstrap circuit.

The resistor R1 is connected between the node N2 and a node N3. The resistor R2 is connected between the node N3 and the ground terminal GND. The resistors R1 and R2 constitute a voltage division circuit, and divide the output voltage Vout at the output terminal OUT. An inverting input terminal (−) of the error amplifier ERR is connected to the node N3. To a first non-inverting input terminal (+) of the error amplifier ERR, a first reference voltage Vref1 is applied. An output terminal of the soft-start circuit SS is connected to a second non-inverting input terminal (+) of the error amplifier ERR. An output terminal of the error amplifier ERR is connected to an inverting input terminal (−) of the PWM comparator PWM. The capacitor C2 is connected to the output terminal of the error amplifier ERR and to one terminal of the resistor R3. Another terminal of the resistor R3 is connected to the ground terminal GND. The serial circuit of the capacitor C2 and the resistor R3 achieves phase compensation. Through phase compensation, the frequency characteristic of the DC-DC converter is compensated so that the DC-DC converter operates in a stable state. An output terminal of the PWM comparator PWM is connected to a first input terminal of the control circuit DRV.

The output terminal of the soft-start circuit SS is connected also to a first non-inverting input terminal (+) of the buffer Bu. To a second non-inverting input terminal (+) of the buffer Bu, a second reference voltage Vref2 is applied. An output terminal of the buffer Bu is connected to a base B of the third transistor Q3 and to an inverting input terminal (−) of the buffer Bu. A collector C of the third transistor Q3 is connected to the ground terminal GND. An emitter E of the third transistor Q3 is connected to a base B of the fourth transistor Q4 and to one terminal of the constant-current source CC1. The resistor Rss is connected between an emitter E of the fourth transistor Q4 and the ground terminal GND. A collector C of the fourth transistor Q4 is connected to a drain D of the fifth transistor Q5. The drain D of the fifth transistor Q5 is connected to a gate G of the fifth transistor Q5. The gate G of the fifth transistor Q5 and a gate G of the sixth transistor Q6 are connected together. Another terminal of the constant-current source CC1, one terminal of the constant-current source CC2, a source S of the fifth transistor Q5, and a source S of the sixth transistor Q6 are connected to a supplied-power terminal Vcc. A drain D of the sixth transistor Q6 is connected to a node N4. The fifth and sixth transistors constitute a current-mirror circuit. The one terminal of the constant-current source CC2 is connected to the node N4. An input terminal of the oscillator OSCr is connected to the node N4. The third and fourth transistors Q3 and Q4 do not have to be bipolar transistors, but may instead be MOS transistors. The fifth and sixth transistors do not have to be MOS transistors, but may instead be bipolar transistors.

An output terminal of the oscillator OSCr is connected to a second input terminal of the control circuit DRV and to a first input terminal of the slope circuit SLOPE. An output terminal of the slope circuit SLOPE is connected to a non-inverting input terminal (+) of the PWM comparator PWM.

Next, the signal flows in, and the circuit operation of, the DC-DC converter including the soft-start circuit in FIG. 1 will be described.

The control circuit DRV outputs drive signals S1 and S2. The drive signals S1 and S2 are input to the gates G of the first and second transistors Q1 and Q2 respectively. This causes the first and second transistors Q1 and Q2 to be turned ON and OFF alternately, so that a current IL passes through the inductor L. The current IL is smoothed by the capacitor C1, so that an output voltage Vout appears at the output terminal OUT. With the load RL connected to the output terminal OUT, an output current Iout is output to it.

The output voltage Vout at the output terminal OUT is divided by the resistors R1 and R2 to generate a feedback voltage Vfb at the node N3. The error amplifier ERR compares whichever of a soft-start input voltage Vss and the first reference voltage Vref1 is lower with the feedback voltage Vfb, and outputs an error signal Verr that is commensurate with the result of the comparison. The feedback voltage Vfb is, for example, 0.6 V to 2 V.

The soft-start input voltage Vss is input also to the first non-inverting input terminal (+) of the buffer Bu in the oscillation circuit OSC. The buffer Bu compares whichever of the soft-start input voltage Vss and the second reference voltage Vref2 is lower with a soft-start output voltage Vsso which is fed back to the inverting input terminal (−) of the buffer Bu, and outputs a soft-start output voltage Vsso that is commensurate with the result of the comparison. Based on the soft-start output voltage Vsso and a constant current Ibias1 generated by the constant-current source CC1, the third and fourth transistors Q3 and Q4 operate to generate a current-mirror input current Id5. Based on the current-mirror input current Id5, the current-mirror circuit constituted by the fifth and sixth transistors Q5 and Q6 generates a current-mirror output current Id6 at the drain D of the sixth transistor Q6. The constant-current source CC2 generates a constant current Ibias2. From the current-mirror output current Id6 and the constant current Ibias2, a soft-start current Iosc is generated. The soft-start current Iosc is, for example, 0.1 µA to 10 µA. The constant-current source CC2 is not an indispensable component.

The soft-start current Iosc is fed to, for example, a ring oscillator that constitutes the oscillator OSCr. A rectangular-wave signal Vosc is generated based on the soft-start current Iosc by the oscillator OSCr, and is output from the output terminal of the oscillator OSCr. According to the magnitude of the soft-start current Iosc, the frequency of the rectangular-wave signal Vosc generated by the oscillator OSCr is determined. Before the current-mirror output current Id6 is generated, the constant current Ibias2 is input as the soft-start current Iosc to the oscillator OSCr.

The rectangular-wave signal Vosc is input to the second input terminal of the control circuit DRV and to the first input terminal of the slope circuit SLOPE. To the second input terminal of the slope circuit SLOPE, the voltage vin at the supplied-power terminal Vin is applied. To the third input terminal of the slope circuit SLOPE, a voltage Vsw at the node N1 is applied. The voltages Vin and Vsw are applied to opposite ends, respectively, of an unillustrated resistor, so that a current that passes through the first transistor Q1 is detected. The slope circuit SLOPE outputs a slope signal Vs1 based on the rectangular-wave signal Vosc, the voltage vin at the supplied-power terminal Vin, and the voltage Vsw at the node N1. The PWM comparator PWM compares the slope signal Vs1 with the error signal Verr to output a pulse-width modulated signal Vpwm. The pulse-width modulated signal Vpwm shifts its logic level such that it is at high level H when the level of the slope signal Vs1 is higher than the level of the error signal Verr and that it is at low level L when the level of the slope signal Vs1 is equal to or lower than the level of the error signal Verr. The control circuit DRV controls the switching of the first and second transistors Q1 and Q2 based on the pulse-width modulated signal Vpwm. The pulse-width modulated signal Vpwm output from the PWM comparator PWM reflects the magnitude of the current passing through the first transistor Q1, and is thus an output signal for current-based control.

When the DC-DC converter in FIG. 1 starts up, the soft-start input voltage Vss output from the soft-start circuit SS increases gradually. Together, the soft-start output voltage Vsso, the current-mirror input current Id5, and the current-mirror output current Id6 increase gradually. Thus, the soft-start current Iosc increases gradually. As a result, the frequency of the rectangular-wave signal Vosc and the frequency of the slope signal Vs1 increase gradually in a linear fashion, and the frequency of the pulse-width modulated signal Vpwm increases gradually in a linear fashion. As a result of the switching speed of the first and second transistors Q1 and Q2 being so controlled as to increase gradually, the output voltage Vout at the output terminal OUT increases gradually. In this way, an overshoot in the output voltage Vout during soft starting is suppressed.

Figure 2:
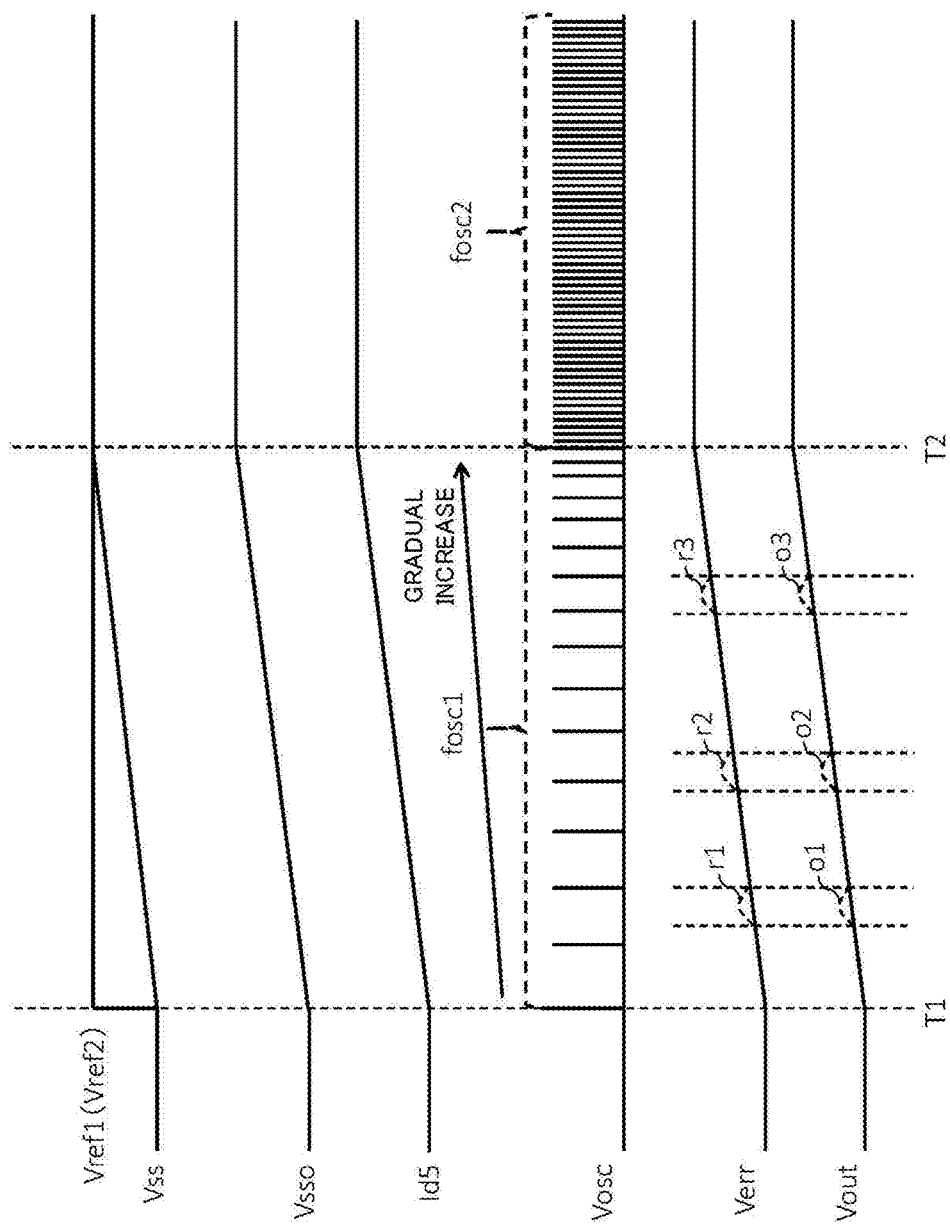
FIG. 2 is a timing chart relating to a DC-DC converter including a soft-start circuit according to the first embodiment of the present invention.

FIG. 2 is a timing chart relating to the DC-DC converter including the soft-start circuit according to the first embodiment shown in FIG. 1. Now, the circuit operation of the DC-DC converter will be described with reference to FIG. 2.

At time point T1, when the DC-DC converter in FIG. 1 starts up, the reference voltages Vref1 and Vref2 rise from a zero level to a constant level. Also, the soft-start input voltage Vss starts to increase gradually. Together, the soft-start output voltage Vsso and the current-mirror input current Id5 start to increase gently. Thus, the oscillation circuit OSC starts to output the rectangular-wave signal Vosc. Accordingly, the control circuit DRV starts to turn the first and second transistors Q1 and Q2 ON and OFF complementarily. As a result, the output voltage Vout at the output terminal OUT starts to increase gradually. Also, the feedback voltage Vfb starts to increase gradually. The error amplifier ERR compares the feedback voltage Vfb with the soft-start input voltage Vss, and starts to increase the error signal Verr gradually.

From time point T1 to time point T2, the soft-start input voltage Vss increases gently. Together, the soft-start output voltage Vsso and the current-mirror input current Id5 increase gently. Accordingly, the oscillation circuit OSC outputs the rectangular-wave signal Vosc with an oscillation frequency fosc1 increasing gradually in a linear fashion. Thus, the switching frequency of the first and second transistors Q1 and Q2 increases gradually. As a result, the output voltage Vout at the output terminal OUT increases gently. Also, the feedback voltage Vfb increases gradually. The error amplifier ERR compares the feedback voltage Vfb with the soft-start input voltage Vss, and increases the error signal Verr gradually. Incidentally, with a conventional soft-start circuit employing a frequency divider, when frequencies are switched, ripples r1, r2, and r3 appear in the feedback voltage Vfb, and this can cause overshoots o1, o2, and o3.

At time point T2, when the soft-start input voltage Vss exceeds the reference voltage Vref1, the error amplifier ERR starts to compare the feedback voltage Vfb with the reference voltage Vref1. Moreover, the buffer circuit Bu clamps the soft-start output voltage Vsso at the value of Vref2, and the soft-start output voltage Vsso stops increasing. Thus, the current-mirror input current Id5 stops increasing. Accordingly, the oscillation frequency fosc of the rectangular-wave signal Vosc stops increasing, and the rectangular-wave signal Vosc starts to be output with a constant oscillation frequency fosc2. As a result, the output voltage Vout stops increasing, and the ON/OFF states of the first and second transistors Q1 and Q2 are so controlled as to keep the output voltage Vout constant. The constant oscillation frequency fosc2 is, for example, 100 kHz to 10 MHz. The period from T1 to T2, that is, after the soft-start input voltage Vss starts to increase until it is clamped, is, for example, 1 msec to 100 msec.

Figure 3:
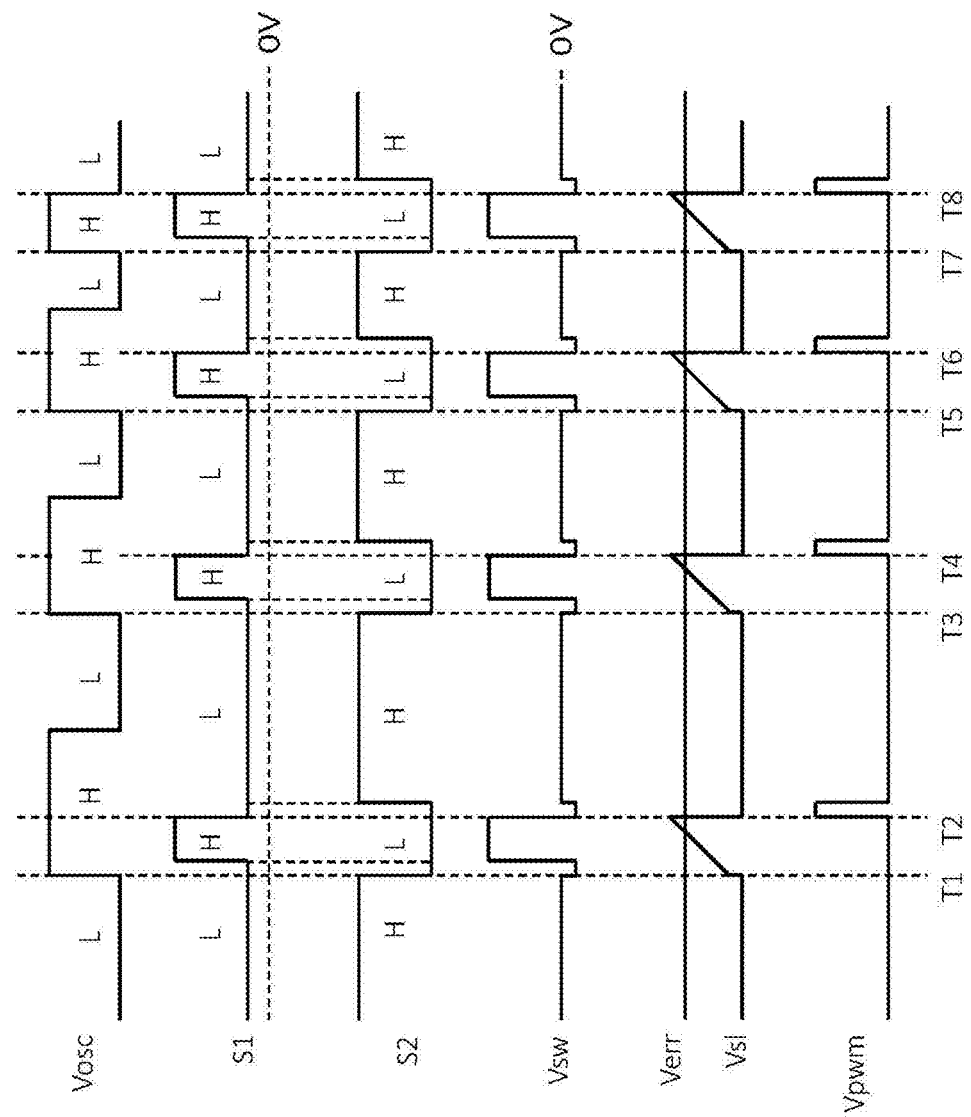
FIG. 3 is a timing chart relating to a DC-DC converter including a soft-start circuit according to the first embodiment of the present invention.

FIG. 3 is a timing chart relating to the DC-DC converter including the soft-start circuit according to the first embodiment of the present invention. Now, the circuit operation of the DC-DC converter will be described with reference to FIG. 3.

At time point T1, when the rectangular-wave signal Vosc turns from low level L to high level H, the drive signal S2 turns from high level H to low level L.

Between time points T1 and T2, a predetermined period after the drive signal S2 turns from high level H to low level L, the drive signal S1 turns from low level L to high level H. This prevents a through current from passing through the first and second transistors Q1 and Q2. Here, the low level L and the high level H of the drive signal S1 depend on the magnitudes of the voltage vin at the supplied-power terminal Vin and the supply voltage vbb fed to the anode of the diode Db. By the bootstrap circuit, the low level L of the drive signal S1 is set not at a zero potential but at a level approximately equal to the voltage vin at the supplied-power terminal Vin. On the other hand, by the bootstrap circuit, the high level H of the drive signal S1 is set at a level higher than the voltage vin by the supply voltage vbb minus the forward voltage Vdb across the diode Db. High level H is thus set at a voltage higher than the voltage vin at the supplied-power terminal Vin by, for example, 3 V to 5V. When the drive signal S1 turns from low level L to high level H, the voltage Vsw turns from the low level L to high level H. In response to a rising edge in the rectangular-wave signal Vosc, the slope signal Vs1 is generated.

At time point T2, when the slope signal Vs1 falls, the pulse-width modulated signal Vpwm rises. Thus, the drive signal S1 turns from high level H the low level L. Moreover, the voltage Vsw turns from high level H to low level L.

A predetermined period after time point T2, Vpwm falls. Moreover, a predetermined period after the drive signal S1 turns from high level H to low level L, the drive signal S2 turns from low level L to high level H. This prevents a through current from passing through the first and second transistors Q1 and Q2.

Operation similar to that from time point T1 past time point T2 takes place from time point T3 past time point T4, from time point T5 past time point T6, and from time point T7 past time point T8. However, the period from time point T2 to time point T3 is longer than that from time point T4 to time point T5, and the period from time point T4 to time point T5 is longer than that from time point T6 to time point T7. In this way, from time point T1 to time point T8, the oscillation frequency fosc of the rectangular-wave signal Vosc increases gradually in a linear fashion, and thus the switching speed of the first and second transistors Q1 and Q2 increases gradually, with the result that the output voltage Vout at the output terminal OUT increases gradually.

Figure 4:
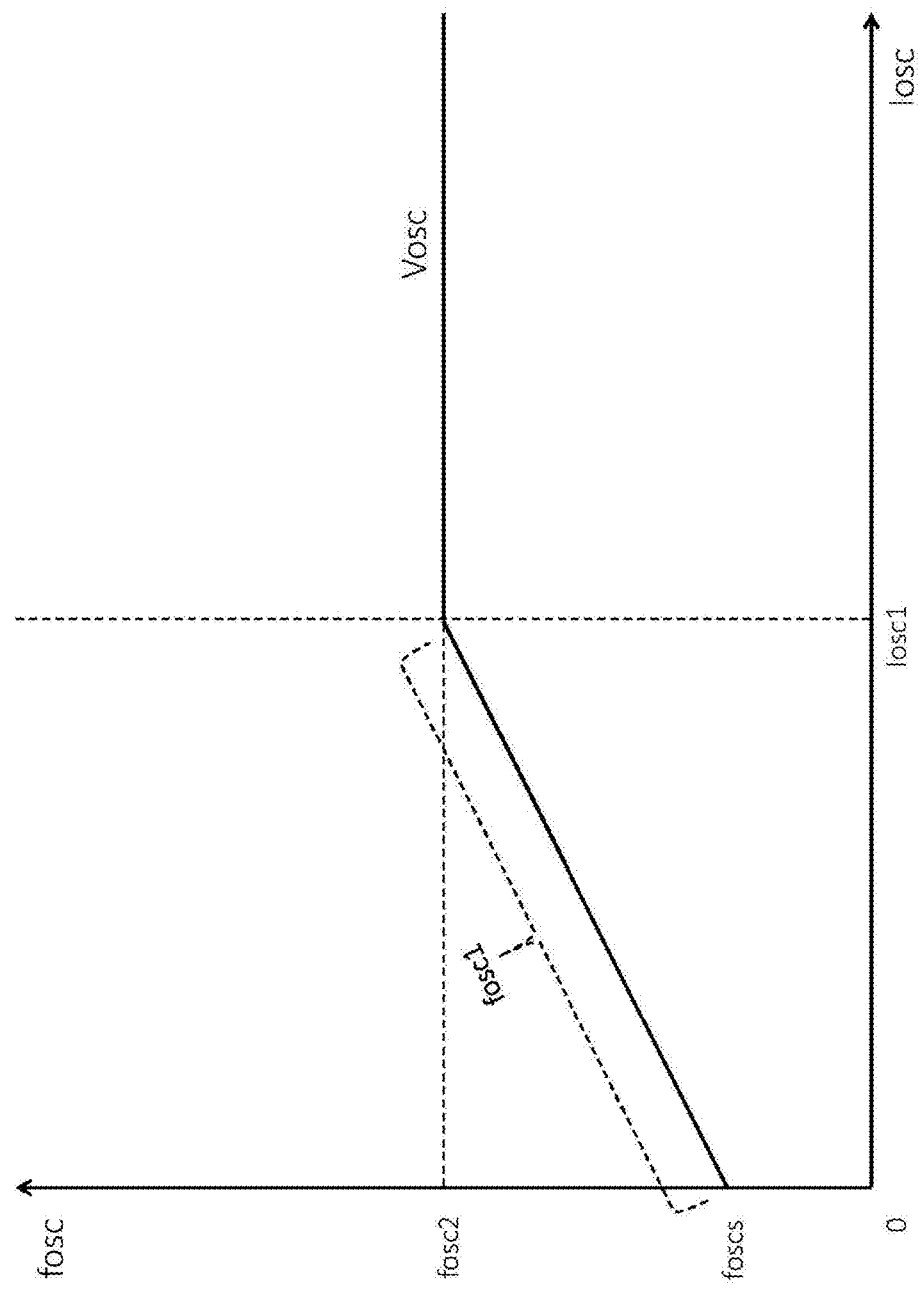
FIG. 4 is a diagram showing a characteristic of oscillation frequency (fosc) versus soft-start current (Iosc) in a DC-DC converter including a soft-start circuit according to the first embodiment of the present invention.

FIG. 4 is a diagram showing the characteristic of the oscillation frequency (fosc) versus the soft-start current (Iosc) in the DC-DC converter including the soft-start circuit according to the first embodiment of the present invention. Now, what FIG. 4 shows will be described with reference also to FIG. 1.

When the current-mirror output current Id6 equals zero, the constant current Ibias2 from the constant-current source CC2 is input as the soft-start current Iosc to the oscillator OSCr, and thus the rectangular-wave signal Vosc with the oscillation frequency fosc is output from the oscillator OSCr. As the current-mirror output current Id6 increases, the soft-start current Iosc increases gradually in a linear fashion, and accordingly the rectangular-wave signal Vosc with an oscillation frequency fosc1 increasing gradually in a linear fashion is output from the oscillator OSCr. Thereafter, when the soft-start current Iosc becomes equal to a current value Iosc1, the buffer Bu circuit clamps the soft-start output voltage Vsso; as a result, the current-mirror output current Id6 stops increasing, and the soft-start current Iosc stops increasing. Accordingly, the oscillation frequency fosc of the rectangular-wave signal Vosc stop increasing. Thus, the rectangular-wave signal Vosc with the constant oscillation frequency fosc2 is output from the oscillator OSCr.

As described above, when the DC-DC converter in FIG. 1 starts up, the oscillation frequency fosc of the oscillation circuit OSC increases gradually in a linear fashion, and thus the output voltage Vout increases gently. Thus, an overshoot in the output voltage Vout is suppressed. Moreover, unlike conventional soft-start circuits, there is no need to divide the frequency of the rectangular-wave signal Vosc from the oscillation circuit OSC. Thus, an overshoot in the output voltage Vout is suppressed more effectively. The eliminated need to divide the frequency of the rectangular-wave signal Vosc eliminates the need for a frequency divider, a comparator, etc., and helps simplify the circuit configuration.

Second Embodiment

Figure 5:
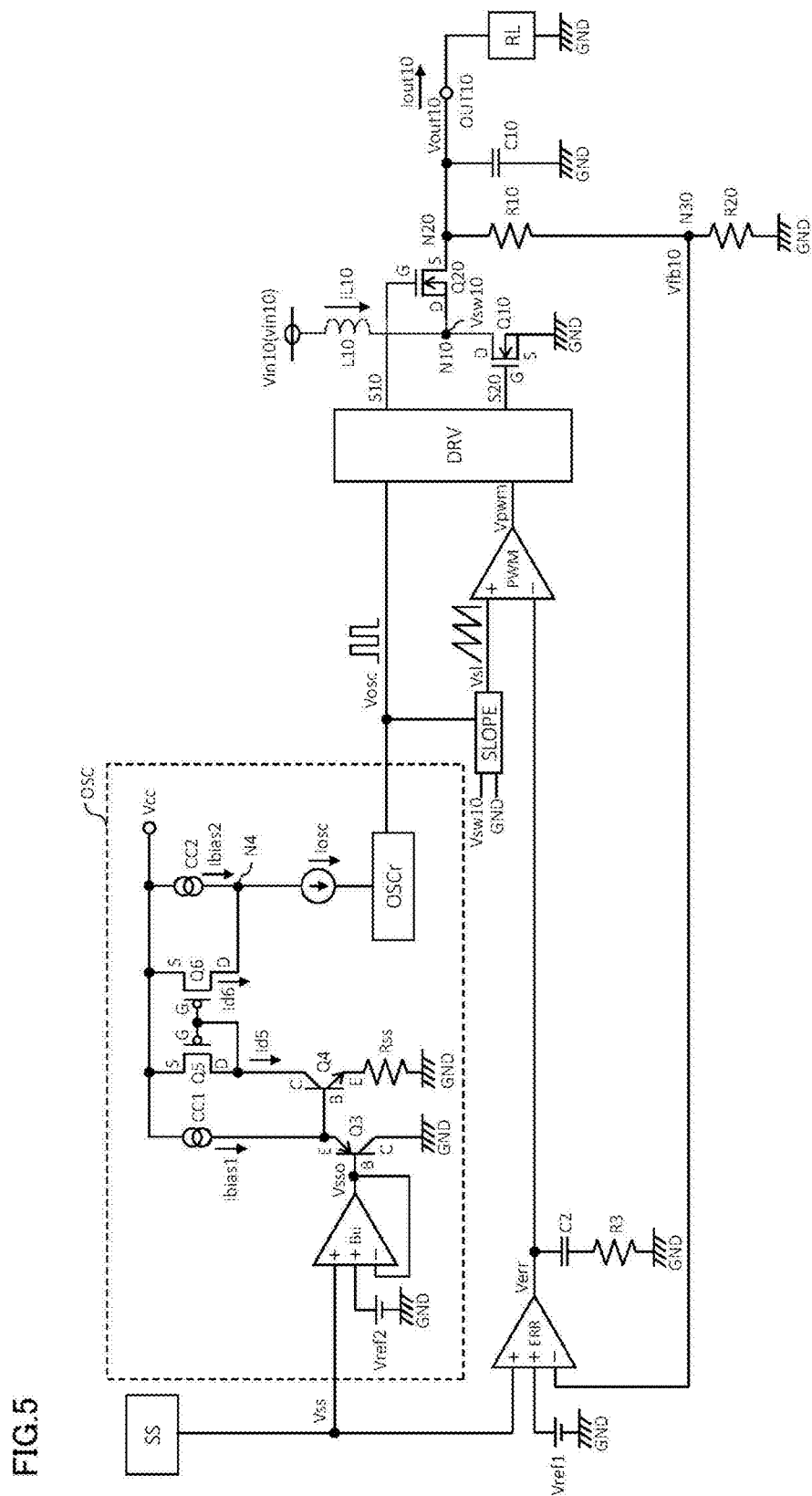
FIG. 5 is a circuit diagram of a DC-DC converter including a soft-start circuit according to a second embodiment of the present invention.

FIG. 5 is a circuit diagram of a DC-DC converter including a soft-start circuit according to a second embodiment of the present invention. The DC-DC converter in FIG. 5 is a synchronous-rectification step-up DC-DC converter.

In FIG. 5, the DC-DC converter is composed of a control circuit DRV, a first transistor Q10, a second transistor Q20, an inductor L10, a capacitor C10, a capacitor C2, a resistor R10, a resistor R20, a resistor R3, an error amplifier ERR, a slope circuit SLOPE, a PWM comparator PWM, a soft-start circuit SS, and an oscillation circuit OSC. The inductor L10 has an inductance of, for example, 0.47 µH to 47 µH. The capacitor C10 has a capacitance of, for example, 10 µF to 1000 µF. The capacitor C2 has a capacitance of, for example, 1000 pF to 10 nF. The resistor R3 has a resistance of, for example, 1 kΩ to 200 kΩ.

The first and second transistors Q10 and Q20 are both NMOS transistors; instead, the first transistor Q10 may be a PMOS transistor while the second transistor Q20 is an NMOS transistor. In a case where an NMOS transistor is used as the first transistor Q10, a bootstrap circuit (unillustrated) is used which includes a capacitor and a diode. The bootstrap circuit permits the first transistor Q1 to be turned ON reliably. As the first and second transistors Q10 and Q20, instead of MOS transistors, even bipolar transistors may be used.

The control circuit DRV turns the first and second transistors Q10 and Q20 ON and OFF complementarily through pulse width modulation control. Here, "complementarily" is assumed to cover not only operation where the ON/OFF states of the first and second transistors Q10 and Q20 are completely reversed but also operation where transition of the first and second transistors Q10 and Q20 between the ON/OFF states takes place with a predetermined delay relative to each other, that is, with a dead time inserted, with a view to preventing a through current.

The oscillation circuit OSC includes a buffer Bu, a resistor Rss, a third to a sixth transistor Q3 to Q6, a constant-current source CC1, a constant-current source CC2, and an oscillator OSCr. The oscillator OSCr is configured as, for example, a ring oscillator, where inverters or differential amplifiers are connected in a ring-shaped array, or a CR oscillator.

Next, the circuit configuration of, and the component interconnection in, the DC-DC converter including the soft-start circuit in FIG. 5 will be described.

A first output terminal of the control circuit DRV is connected to a gate G of the first transistor Q10. A second output terminal of the control circuit DRV is connected to a gate G of the second transistor Q20. The inductor L10 is connected between a supplied-power terminal (high-potential terminal) Vin10 and a node N10. A drain D of the first transistor Q10 is connected to the node N10. A source S of the first transistor Q10 is connected to a ground terminal (low-potential terminal) GND. A drain D of the second transistor Q20 is connected to the node N10. A source S of the second transistor Q20 is connected to a node N20. The capacitor C10 is connected between the node N20 and the ground terminal GND. The node N20 is connected to an output terminal OUT10. To the output terminal OUT10, a load RL is connected. Connected as the load RL is, for example, an LED (light-emitting diode).

The resistor R10 is connected between the node N20 and a node N30. The resistor R20 is connected between the node N30 and the ground terminal GND. The resistors R10 and R20 constitute a voltage division circuit, and divide the output voltage Vout10 at the output terminal OUT10. An inverting input terminal (−) of the error amplifier ERR is connected to the node N30. To a first non-inverting input terminal (+) of the error amplifier ERR, a first reference voltage Vref1 is applied. An output terminal of the soft-start circuit SS is connected to a second non-inverting input terminal (+) of the error amplifier ERR. An output terminal of the error amplifier ERR is connected to an inverting input terminal (−) of the PWM comparator PWM. The capacitor C2 is connected to the output terminal of the error amplifier ERR and to one terminal of the resistor R3. Another terminal of the resistor R3 is connected to the ground terminal GND. The serial circuit of the capacitor C2 and the resistor R3 achieves phase compensation. Through phase compensation, the frequency characteristic of the DC-DC converter is compensated so that the DC-DC converter operates in a stable state. An output terminal of the PWM comparator PWM is connected to a first input terminal of the control circuit DRV.

The output terminal of the soft-start circuit SS is connected also to a first non-inverting input terminal (+) of the buffer Bu. To a second non-inverting input terminal (+) of the buffer Bu, a second reference voltage Vref2 is applied. An output terminal of the buffer Bu is connected to a base B of the third transistor Q3 and to an inverting input terminal (−) of the buffer Bu. A collector C of the third transistor Q3 is connected to the ground terminal GND. An emitter E of the third transistor Q3 is connected to a base B of the fourth transistor Q4 and to one terminal of the constant-current source CC1. The resistor Rss is connected between an emitter E of the fourth transistor Q4 and the ground terminal GND. A collector C of the fourth transistor Q4 is connected to a drain D of the fifth transistor Q5. The drain D of the fifth transistor Q5 is connected to a gate G of the fifth transistor Q5. The gate G of the fifth transistor Q5 and a gate G of the sixth transistor Q6 are connected together. Another terminal of the constant-current source CC1, one terminal of the constant-current source CC2, a source S of the fifth transistor Q5, and a source S of the sixth transistor Q6 are connected to a supplied-power terminal Vcc. A drain D of the sixth transistor Q6 is connected to a node N4. The fifth and sixth transistors constitute a current-mirror circuit. The one terminal of the constant-current source CC2 is connected to the node N4. An input terminal of the oscillator OSCr is connected to the node N4. The third and fourth transistors Q3 and Q4 do not have to be bipolar transistors, but may instead be MOS transistors. The fifth and sixth transistors do not have to be MOS transistors, but may instead be bipolar transistors.

An output terminal of the oscillator OSCr is connected to a second input terminal of the control circuit DRV and to a first input terminal of the slope circuit SLOPE. An output terminal of the slope circuit SLOPE is connected to a non-inverting input terminal (+) of the PWM comparator PWM.

Next, the signal flows in, and the circuit operation of, the DC-DC converter including the soft-start circuit in FIG. 5 will be described.

The control circuit DRV outputs drive signals S10 and S20. The drive signals S10 and S20 are input to the gates G of the first and second transistors Q10 and Q20 respectively. This causes the first and second transistors Q10 and Q20 to be turned ON and OFF alternately, so that a current IL10 passes through the inductor L10. The current IL10 is smoothed by the capacitor C10, so that an output voltage Vout10 appears at the output terminal OUT10. With the load RL connected to the output terminal OUT10, an output current Iout10 is output to it.

The output voltage Vout10 at the output terminal OUT10 is divided by the resistors R10 and R20 to generate a feedback voltage Vfb10 at the node N30. The error amplifier ERR compares whichever of a soft-start input voltage Vss and the first reference voltage Vref1 is lower with the feedback voltage Vfb10, and outputs an error signal Verr that is commensurate with the result of the comparison. The feedback voltage Vfb10 is, for example, 0.6 V to 2 V.

The soft-start input voltage Vss is input also to the first non-inverting input terminal (+) of the buffer Bu in the oscillation circuit OSC. The buffer Bu compares whichever of the soft-start input voltage Vss and the second reference voltage Vref2 is lower with a soft-start output voltage Vsso which is fed back to the inverting input terminal (−) of the buffer Bu, and outputs a soft-start output voltage Vsso that is commensurate with the result of the comparison. Based on the soft-start output voltage Vsso and a constant current Ibias1 generated by the constant-current source CC1, the third and fourth transistors Q3 and Q4 operate to generate a current-mirror input current Id5. Based on the current-mirror input current Id5, the current-mirror circuit constituted by the fifth and sixth transistors Q5 and Q6 generates a current-mirror output current Id6 at the drain D of the sixth transistor Q6. The constant-current source CC2 generates a constant current Ibias2. From the current-mirror output current Id6 and the constant current Ibias2, a soft-start current Iosc is generated. The soft-start current Iosc is, for example, 0.1 μA to 10 μA. The constant-current source CC2 is not an indispensable component.

The soft-start current Iosc is fed to, for example, a ring oscillator that constitutes the oscillator OSCr. A rectangular-wave signal Vosc is generated based on the soft-start current Iosc by the oscillator OSCr, and is output from the output terminal of the oscillator OSCr. According to the magnitude of the soft-start current Iosc, the frequency of the rectangular-wave signal Vosc generated by the oscillator OSCr is determined. Before the current-mirror output current Id6 is generated, the constant current Ibias2 is input as the soft-start current Iosc to the oscillator OSCr.

The rectangular-wave signal Vosc is input to the second input terminal of the control circuit DRV and to the first input terminal of the slope circuit SLOPE. To the second input terminal of the slope circuit SLOPE, the voltage vin10 at the supplied-power terminal Vin10 is applied. To the third input terminal of the slope circuit SLOPE, a voltage Vsw10 at the node N10 is applied. The voltages Vin10 and Vsw10 are applied to opposite ends, respectively, of an unillustrated resistor, so that a current that passes through the first transistor Q10 is detected. The slope circuit SLOPE outputs a slope signal Vs1 based on the rectangular-wave signal Vosc, the voltage vin10 at the supplied-power terminal Vin10, and the voltage Vsw10 at the node N10. The PWM comparator PWM compares the slope signal Vs1 with the error signal Verr to output a pulse-width modulated signal Vpwm. The pulse-width modulated signal Vpwm shifts its logic level such that it is at high level H when the level of the slope signal Vs1 is higher than the level of the error signal Verr and that it is at low level L when the level of the slope signal Vs1 is equal to or lower than the level of the error signal Verr. The control circuit DRV controls the switching of the first and second transistors Q10 and Q20 based on the pulse-width modulated signal Vpwm. The pulse-width modulated signal Vpwm output from the PWM comparator PWM reflects the magnitude of the current passing through the first transistor Q10, and is thus an output signal for current-based control.

When the DC-DC converter in FIG. 5 starts up, the soft-start input voltage Vss output from the soft-start circuit SS increases gradually. Together, the soft-start output voltage Vsso, the current-mirror input current Id5, and the current-mirror output current Id6 increase gradually. Thus, the soft-start current Iosc increases gradually. As a result, the frequency of the rectangular-wave signal Vosc and the frequency of the slope signal Vs1 increase gradually in a linear fashion, and the frequency of the pulse-width modulated signal Vpwm increases gradually in a linear fashion. As a result of the switching speed of the first and second transistors Q10 and Q20 being so controlled as to increase gradually, the output voltage Vout10 at the output terminal OUT10 increases gradually. In this way, an overshoot in the output voltage Vout10 during soft starting is suppressed.

As described above, when the DC-DC converter in FIG. 5 starts up, the oscillation frequency fosc of the oscillation circuit OSC increases gradually in a linear fashion, and thus the output voltage Vout10 increases gently. Thus, an overshoot in the output voltage Vout10 is suppressed. Moreover, unlike conventional soft-start circuits, there is no need to divide the frequency of the rectangular-wave signal Vosc from the oscillation circuit OSC. Thus, an overshoot in the output voltage Vout10 is suppressed more effectively. The eliminated need to divide the frequency of the rectangular-wave signal Vosc eliminates the need for a frequency divider, a comparator, etc., and helps simplify the circuit configuration.

An oscillation circuit OSC and a soft-start circuit SS according to the present invention can be used also in a step-up/down DC-DC converter that can operate as both a step-up and a step-down DC-DC converter.

Figure 6:
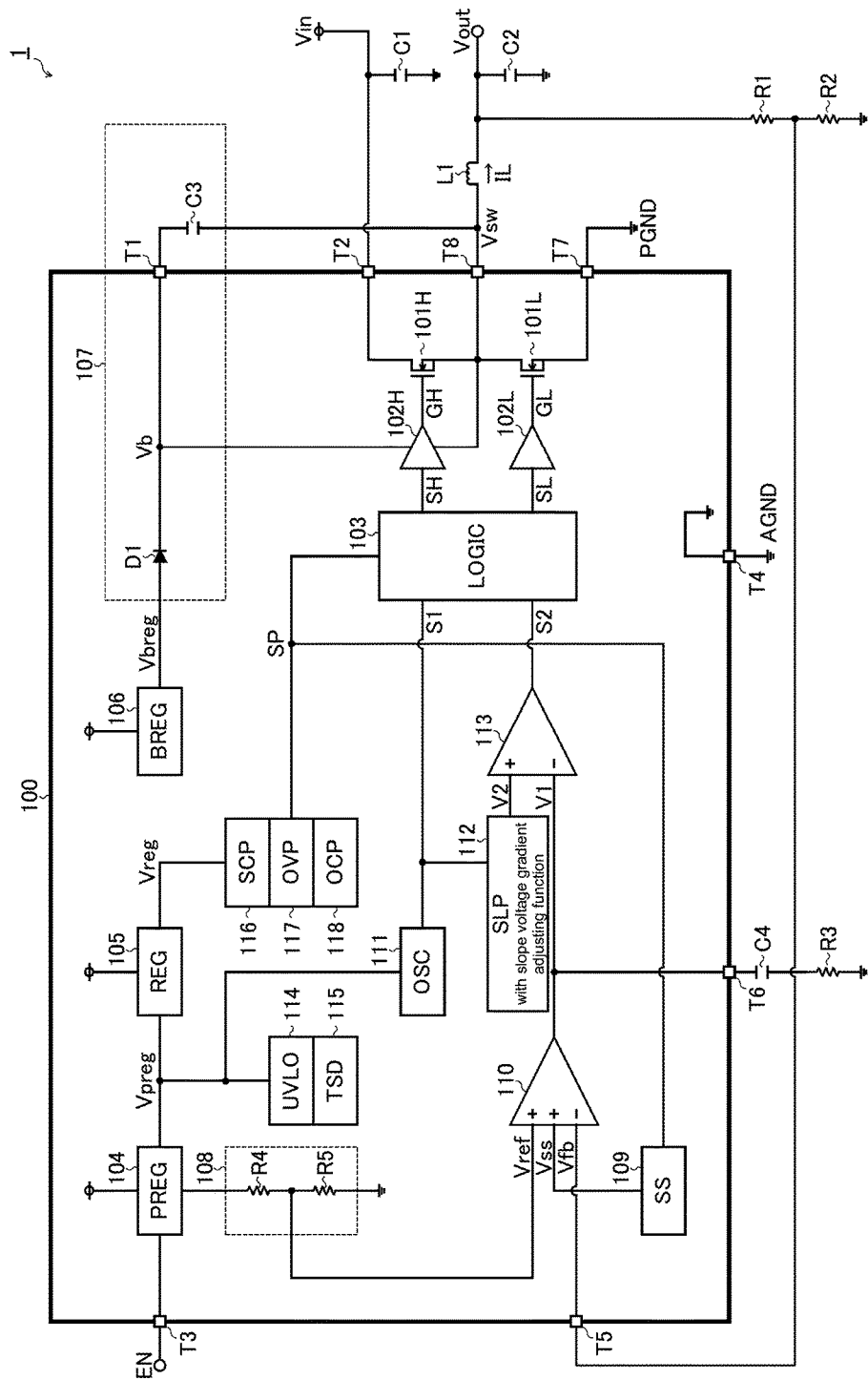
FIG. 6 is an overall block diagram showing a basic configuration of a switching power supply device.

Switching Power Supply Device (Basic Configuration):

FIG. 6 is an overall block diagram showing the basic configuration of a switching power supply device. The switching power supply device 1 of this configuration example is a step-down DC-DC converter that steps down an input voltage Vin to generate a desired output voltage Vout, and includes a semiconductor device 100 and various discrete components externally connected to it (resistors R1 to R3, capacitors C1 to C4, and an inductor L1).

The semiconductor device 100 is a so-called switching power supply IC, and has the following circuit elements integrated together: an upper transistor 101H, a lower transistor 101L, an upper driver circuit 102H, a lower driver circuit 102L, a logic circuit 103, a first regulator circuit 104, a second regulator circuit 105, a third regulator circuit 106, a bootstrap circuit 107, a reference voltage generation circuit 108, a soft-start voltage generation circuit 109, an error amplifier circuit 110, an oscillation circuit 111, a slope voltage generation circuit 112, a comparison circuit 113, a reduced-voltage protection circuit 114, a temperature protection circuit 115, a short-circuit protection circuit 116, an overvoltage protection circuit 117, and an overcurrent protection circuit 118.

The semiconductor device 100 also has, as means for establishing electrical connection with outside the device, external terminals T1 to T8. The external terminal T1 (bootstrap terminal) is connected to a first end of the capacitor C3. A second end of the capacitor C3 is connected to the external terminal T8. The external terminal T2 (supplied-power terminal) is connected to an input node of the input voltage Vin and to a first end of the capacitor C1. A second end of the capacitor C1 is connected to a ground node. The external terminal T3 (enable terminal) is connected to an input node of an enable signal EN. The external terminal T4 (analog ground terminal) is connected to an analog ground node AGND. The external terminal T5 (feedback terminal) is connected to the connection node between the resistors R1 and R2 (i.e., an application node of a feedback voltage Vfb). The external terminal T6 (phase compensation terminal) is connected to a first end of the capacitor C4. A second end of the capacitor C4 is connected to a first end of the resistor R3. A second end of the resistor R3 is connected to the ground node. The external terminal T7 (power ground terminal) is connected to a power ground node PGND. The external terminal T8 (switching terminal) is connected to a first end of the inductor L1. A second end of the inductor L1 is connected to an output node of the output voltage Vout, to a first end of the capacitor C2, and to a first end of the resistor R1. A second end of the capacitor C2 is connected to the ground node. A second end of the resistor R1 is connected to a first end of the resistor R2. A second end of the resistor R2 is connected to the ground node.

Next, the circuit blocks integrated into the semiconductor device 100 will be described one by one in outline.

The upper transistor 101H is an N-channel MOS (metal-oxide-semiconductor) field-effect transistor that is connected between the external terminals T2 and T8, and functions as an output transistor. A drain of the upper transistor 101H is connected to the external terminal T2. A source and a back-gate of the upper transistor 101H are both connected to the external terminal T8. A gate of the upper transistor 101H is connected to an output node of the upper driver circuit 102H (i.e., an output node of an upper gate signal GH). The upper transistor 101H is ON when the upper gate signal GH is at high level, and is OFF when the upper gate signal GH is at low level.

The lower transistor 101L is an N-channel MOS field-effect transistor that is connected between the external terminals T8 and T7, and functions as a synchronous-rectification transistor. A drain of the lower transistor 101L is connected to the external terminal T8. A source and a back-gate of the lower transistor 101L are both connected to the external terminal T7. A gate of the lower transistor 101L is connected to an output node of the lower driver circuit 102L (i.e., an output node of a lower gate signal GL). The lower transistor 101L is ON when the lower gate signal GL is at high level, and is OFF when the lower gate signal GL is at low level.

The upper and lower transistors 101H and 101L are turned ON and OFF complementarily, so that a switching voltage Vsw with a rectangular waveform (with a high level equal to Vin and a low level equal to PGND) appears at the external terminal T8. This switching voltage Vsw is smoothed by the inductor L1 and the capacitor C2 to generate an output voltage Vout.

Thus, in the switching power supply device 1 of this configuration example, the upper and lower transistors 101H and 101L, the inductor L1, and the capacitor C2 together constitute a switching output stage that steps down an input voltage Vin to generate a desired output voltage Vout.

The upper and lower transistors 101H and 101L may instead be externally connected to the semiconductor device 100. In that case, additional external terminals are required for outputting the upper and lower gate signals GH and GL to outside the device. As the upper transistor 101H, a p-channel MOS field-effect transistor may instead be used. In that case, the bootstrap circuit 107 is unnecessary. As the upper and lower transistors 101H and 101L, IGBTs (insulated-gate bipolar transistors) or the like may instead be used.

The switching output stage may achieve rectification, instead of by synchronous rectification employing the lower transistor 101L, by rectification employing a diode. In that case, the lower transistor 101L is replaced with a diode of which a cathode is connected to the external terminal T8 and an anode is connected to the external terminal T7.

The upper driver circuit 102H enhances the current capacity of an upper ON/OFF control signal SH to generate the upper gate signal GH (with a high level equal to Vb and a low level equal to Vsw), and thereby drives the upper transistor 101H in the switching output stage.

The lower driver circuit 102L enhances the current capacity of a lower ON/OFF control signal SL to generate the lower gate signal GL (with a high level equal to Vreg and a low level equal to PGND), and thereby drives the lower transistor 101L in the switching output stage.

The logic circuit 103 generates the upper and lower ON/OFF control signals SH and SL according to an ON signal S1 and an OFF signal S2 so as to drive the upper and lower transistors 101H and 101L complementarily. Specifically, at a pulse edge in the ON signal S1, the logic circuit 103 turns the upper ON/OFF control signal SH to high level and turns the lower ON/OFF control signal SL to low level; conversely, at a pulse edge in the OFF signal S2, the logic circuit 103 turns the upper ON/OFF control signal SH to low level and turns the lower ON/OFF control signal SL to high level.

The logic circuit 103 is provided with a function of securing a period in which the upper and lower transistors 101H and 101L are simultaneously OFF (a so-called dead time) by slightly displacing the logic level shift timing of the upper and lower ON/OFF control signals SH and SL relative to each other in order to prevent a through current from passing through the switching output stage.

The logic circuit 103 is provided also with a function of forcibly stopping the switching operation of the switching output stage (a function of turning both the upper and lower ON/OFF control signals SH and SL to low level) according to an abnormality protection signal SP.

The first regulator circuit 104 corresponds to a pre-regulator that generates a first constant voltage Vpreg from the input voltage Vin. The first regulator circuit 104 has its output operation enabled and disabled according to an enable signal EN that is input via the external terminal T3. Specifically, the first regulator circuit 104 has its output operation enabled when the enable signal EN is at high level and disabled when the enable signal EN is at low level.

The second regulator circuit 105 corresponds to a main regulator that generates a second constant voltage Vreg from the first constant voltage Vpreg. A two-stage configuration with a pre-regulator and a main regulator like this makes it possible to generate a second constant voltage Vreg that is hardly affected by variation in input.

The third regulator circuit 106 corresponds to a bootstrap regulator that generates a third constant voltage Vbreg from the input voltage Vin.

The bootstrap circuit 107 generates a boost voltage Vb by using the capacitor C3 mentioned previously and a diode D1 incorporated in the semiconductor device 100, and feeds the boost voltage Vb to the upper driver circuit 102H. An anode of the diode D1 is connected to an output node of the third regulator circuit 106 (i.e., an output node of the third constant voltage Vbreg). A cathode of the diode D1 is connected to the external terminal T1 (i.e., an application node of the boost voltage Vb).

The operation of the bootstrap circuit 107 will now be described briefly. When the switching voltage Vsw appearing at the external terminal T8 is at low level (equal to PGND=0 V), the diode D1 is forward-biased, and thus the capacitor C3 is charged by the third constant voltage Vbreg. At this time, the boost voltage Vb has a voltage value (=Vbreg−Vf) equal to the third constant voltage Vbreg minus the forward voltage drop Vf across the diode D1.

On the other hand, when the switching voltage Vsw rises from low level (0 V) to high level (Vin), in conformity with the law of conservation of charge in the capacitor C3, the boost voltage Vb is raised as much as the rise in the switching voltage Vsw. Specifically, the boost voltage Vb comes to have a high voltage (=Vin+Vbreg−Vf) which is the sum of the input voltage Vin and the voltage across the capacitor C3 (Vbreg−Vf).

Feeding this boost voltage Vb to the upper driver circuit 102H makes the high level of the upper gate signal GH higher than the input voltage Vin, and thus makes it possible to turn the upper transistor 101H ON.

The reference voltage generation circuit 108 includes resistors R4 and R5 that are connected in series between an output node of the first regulator circuit 104 (i.e., an output node of the first constant voltage Vpreg) and the ground node, and outputs, from the connection node between those resistors, a reference voltage Vref (corresponding to a division voltage of the first constant voltage Vpreg).

The soft-start voltage generation circuit 109 generates a soft-start voltage Vss which rises gently when the switching power supply device 1 starts up. The soft-start voltage generation circuit 109 is provided also with a function of resetting the soft-start voltage Vss to an initial value (0 V) according to the abnormality protection signal SP.

The error amplifier circuit 110 generates an error voltage V1 according to the difference between the reference voltage Vref input to a first non-inverting input terminal (+) of the error amplifier circuit 110 or the soft-start voltage Vss input to a second non-inverting input terminal (+) of the error amplifier circuit 110, whichever is lower, and the feedback voltage Vfb applied to an inverting input terminal (−) of the error amplifier circuit 110. The error voltage V1 rises when the feedback voltage Vfb is lower than the reference voltage Vref (or the soft-start voltage Vss), and falls when the feedback voltage Vfb is higher than the reference voltage Vref (or the soft-start voltage Vss). To an output terminal of the error amplifier circuit 110, a phase compensation circuit (the capacitor C4 and the capacitor C3) is connected.

The oscillation circuit 111 operates by being fed with the first constant voltage Vpreg, and generates the ON signal S1 with a rectangular waveform at a switching frequency fsw.

The slope voltage generation circuit 112 generates a slope voltage V2 with a slope waveform (triangular or saw-tooth waveform) in synchronism with the ON signal S1. The slope voltage generation circuit 112 is provided with a function (slope compensating function) of adjusting the gradient of the slope voltage V2 according to the magnitude of an inductor current IL that passes through the switching output stage. This configuration allows so-called current mode control, and helps enhance the load response of the switching power supply device 1.

The comparison circuit 113 generates the OFF signal S2 by comparing the error voltage V1 applied to an inverting input terminal (−) of the comparison circuit 113 and the slope voltage V2 applied to a non-inverting input terminal (+) of the comparison circuit 113. The OFF signal S2 is at low level when the error voltage V1 is higher than the slope voltage V2, and is at high level when the error voltage V1 is lower than the slope voltage V2.

The reduced-voltage protection circuit 114 monitors the first constant voltage Vpreg to detect a reduced-voltage abnormality.

The temperature protection circuit 115 operates by being fed with the first constant voltage Vpreg, and monitors the junction temperature Tj of the semiconductor device 100 to detect a temperature abnormality.

The short-circuit protection circuit 116 operates by being fed with the second constant voltage Vreg, and monitors, for example, the feedback voltage Vfb to detect a short-circuit abnormality (e.g., a short-circuited-to-ground state in which the output node of the output voltage Vout is short-circuited to the ground node or a similar low-potential node).

The overvoltage protection circuit 117 operates by being fed with the second constant voltage Vreg, and monitors, for example, the feedback voltage Vfb to detect an overvoltage abnormality.

The overcurrent protection circuit 118 operates by being fed with the second constant voltage Vreg, and monitors, for example, the switching voltage Vsw to detect an overcurrent through the switching output stage. The overcurrent protection circuit 118 is, for example, of a pulse-by-pulse type, which repeats forcible suspension and self-recovery of switching operation every period.

Figure 7:
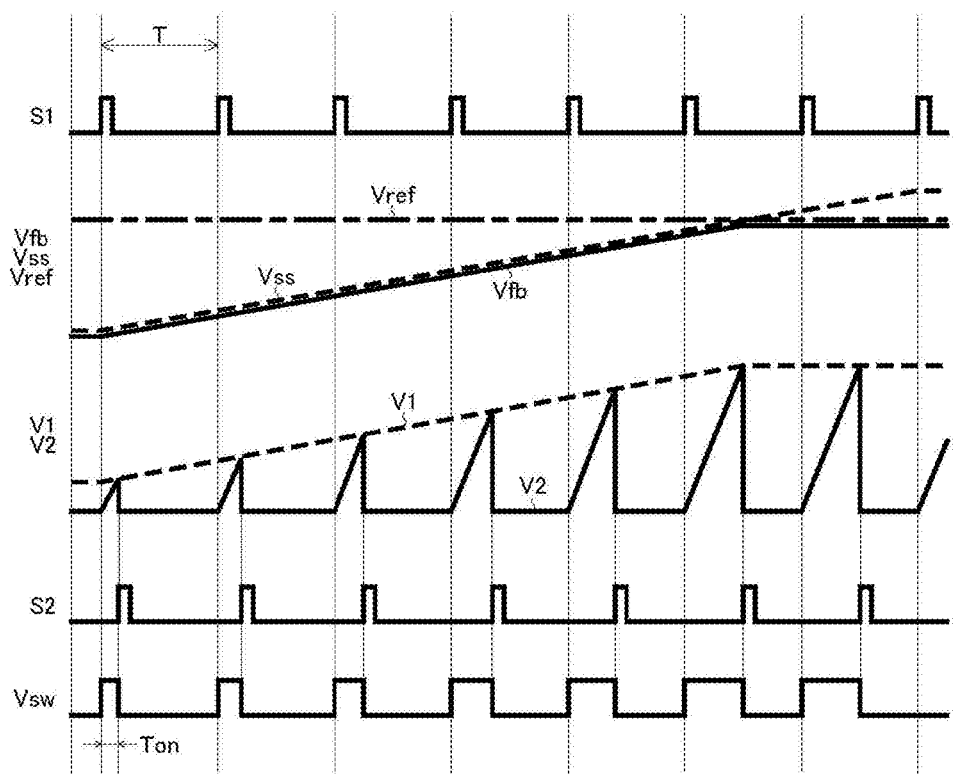
FIG. 7 is a timing chart showing one example of soft-start operation.

Soft-Start Operation:

FIG. 7 is a timing chart showing one example of soft-start operation, depicting, from top down, the ON signal S1, the feedback voltage Vfb (solid line), the soft-start voltage Vss (broken line), the reference voltage Vref (dash-and-dot line), the error voltage V1 (broken line), the slope voltage V2 (solid line), the OFF signal S2, and the switching voltage Vsw.

When the ON signal S1 rises to high level, the upper transistor 101H turns ON, and the lower transistor 101L turns OFF; thus, the switching voltage Vsw turns to high level. At this time, the slope voltage V2 starts to increase from the initial value with a predetermined gradient.

Thereafter, when the slope voltage V2 becomes higher than the error voltage V1, the OFF signal S2 rises to high level. As a result, the upper transistor 101H turns OFF, and the lower transistor 101L turns ON; thus, the switching voltage Vsw turns to low level. At this time, the slope voltage V2 is reset to the initial value.

The timing that the error voltage V1 and the slope voltage V2 cross each other occurs the later the higher the error voltage V1 is. The ON-period Ton of the upper transistor 101H is then longer, and hence the ON-duty Don of the upper transistor 101H (the proportion of its ON-period Ton in the switching period T; Don=Ton/T) is higher.

Conversely, the lower the error voltage V1 is, the earlier the timing that it crosses the slope voltage V2. The ON-period Ton of the upper transistor 101H is then shorter, and hence the ON-duty Don of the upper transistor 101H is lower.

Thus, in the switching power supply device 1, as a result of the ON-duty Don of the upper transistor 101H being determined according to the error voltage V1, the desired output voltage Vout is generated from the input voltage Vin.

The soft-start voltage Vss increases gently from 0 V after the switching power supply device 1 starts up, eventually rising up to a voltage value higher than the reference voltage Vref. Moreover, as mentioned previously, the error amplifier circuit 110 generates the error voltage V1 according to the difference between the reference voltage Vref or the soft-start voltage Vss, whichever is lower, and the feedback voltage Vfb. Accordingly, after the start-up of the switching power supply device 1, during the period (i.e., soft-start period) in which the soft-start voltage Vss is lower than the reference voltage Vref, the error voltage V1 is generated that is commensurate with the difference between the feedback voltage Vfb and the soft-start voltage Vss.

The error voltage V1 thus generated increases gently from around 0 V as the soft-start voltage Vss rises. Accordingly the ON-duty Don of the upper transistor 101H increases gradually from its minimum value, and this makes it possible to prevent a rush current through the capacitor C2 or the load.

Figure 8:
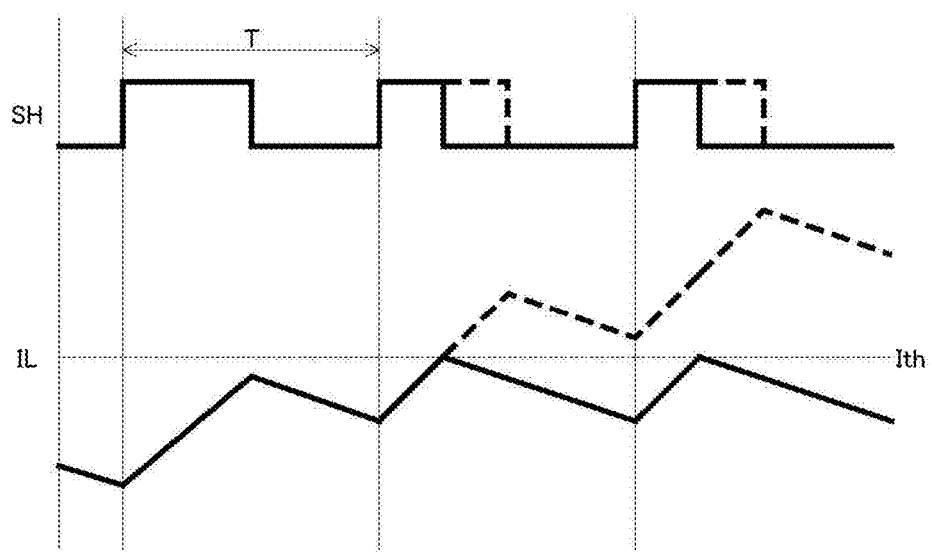
FIG. 8 is a timing chart showing one example of overcurrent protection operation.

Overcurrent Protection Operation:

FIG. 8 is a timing chart showing one example of overcurrent protection operation, depicting, from top down, the upper ON/OFF control signal SH and the inductor current IL (solid line, with overcurrent protection; broken line, without overcurrent protection).

As shown in FIG. 8, the overcurrent protection circuit 118 forcibly stops the switching operation of the switching output stage when the inductor current IL becomes higher than a predetermined threshold current Ith, and thereby limits the inductor current IL so that it may not exceed the threshold current Ith.

The error amplifier circuit 110 of a pulse-by-pulse type, in particular, repeats forcible suspension and self-recovery of switching operation every period. That is, even if an overcurrent is detected and the switching operation of the switching output stage is forcibly stopped in a given period, in the next period, the switching operation of the switching output stage is self-recovered (restarted). Thus, even if a variation in load or the like actuates overcurrent protection, output operation can be restarted.

Figure 9:
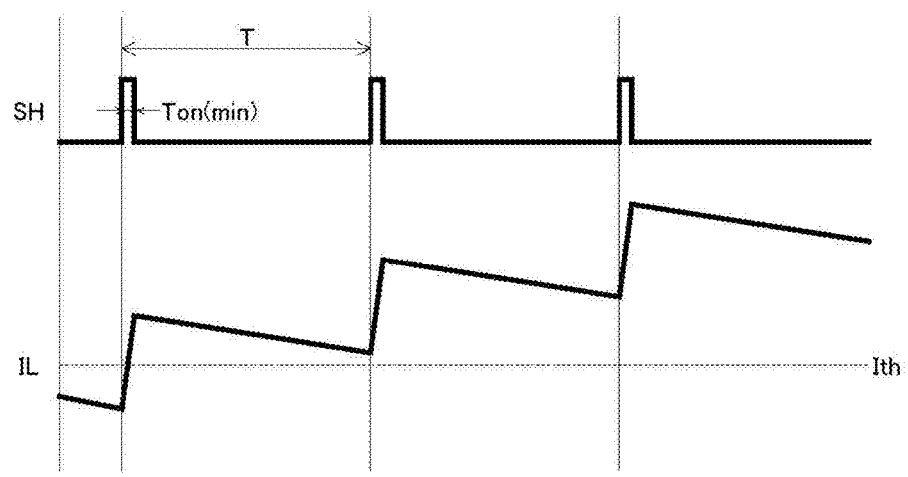
FIG. 9 is a timing chart showing a problem with overcurrent protection operation.

FIG. 9 is a timing chart showing a problem with overcurrent protection operation, depicting, from top down, the upper ON/OFF control signal SH and the inductor current IL. FIG. 9 shows behavior observed when the output node of the output voltage Vout is short-circuited to ground via a low-impedance path in an application in which the input voltage Vin is high.

If such short-circuiting of the output to ground occurs, with the overcurrent protection circuit 118 of a pulse-by-pulse type that repeats forcible suspension and self-recovery (restarting) of switching operation, even when the ON-period Ton in each switching period T is reduced to the minimum (i.e., the minimum ON-period Ton(min)), it may still be impossible to limit the overcurrent (reduce the inductor current IL in the forcible OFF period) in time; this leaves the inductor current IL to keep rising and possibly leads to destruction of the switching output stage.

Figure 10:
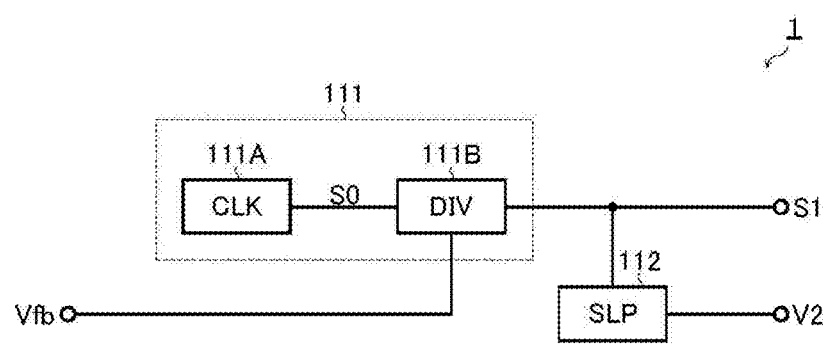
FIG. 10 is a principal-portion block diagram of a first practical example of a switching power supply device.

Switching Power Supply Device (First Practical Example):

FIG. 10 is a principal-portion block diagram of a first practical example of the switching power supply device 1. This practical example, based on the basic configuration (FIG. 6) described previously, has an improved oscillation circuit 111. Specifically, in the switching power supply device 1 of the first practical example, the oscillation circuit 111 includes a reference oscillation circuit 111A and a frequency division circuit 111B.

The reference oscillation circuit 111A generates a reference clock signal S0 with a fixed frequency f0.

The frequency division circuit 111B generates the ON signal S1 by dividing the frequency of the reference clock signal S0 by a frequency division factor n commensurate with the feedback voltage Vfb. In a case where the output voltage Vout falls within the input dynamic range of the frequency division circuit 111B, the output voltage Vout may be directly input to it instead of the feedback voltage Vfb.

Thus, the oscillation circuit 111 is provided with a function of varying the switching frequency fsw (=f0/n) of the ON signal S1 according to the feedback voltage Vfb. Specifically, the oscillation circuit 111 is so configured as to lower the switching frequency fsw when the feedback voltage Vfb is lower than a predetermined threshold voltage.

Figure 11:
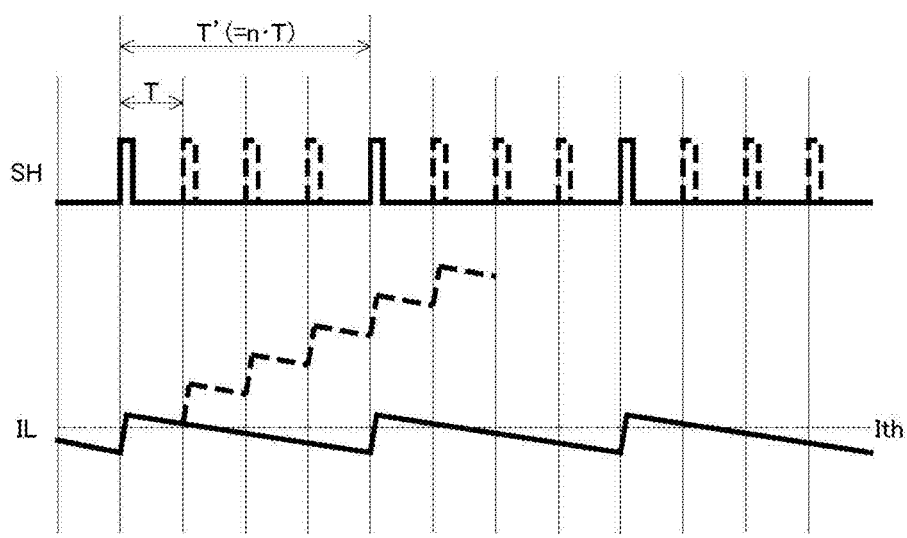
FIG. 11 is a timing chart showing an improved result of overcurrent protection operation.

FIG. 11 is a timing chart showing an improved result of overcurrent protection operation, depicting, from top down, the upper ON/OFF control signal SH and the inductor current IL (solid line, variable fsw; broken line, fixed fsw). Like FIG. 9 referred to previously, FIG. 11 shows behavior observed when the output node of the output voltage Vout is short-circuited to ground via a low-impedance path in an application in which the input voltage Vin is high.

As shown in FIG. 11, when the output is short-circuited to ground and the feedback voltage Vfb falls below the predetermined threshold voltage, it is possible, by lowering the switching frequency fsw and thereby prolonging the forcible suspension period of the switching operation, to enhance the overcurrent protection function of the pulse-by-pulse type configuration.

Figure 12:
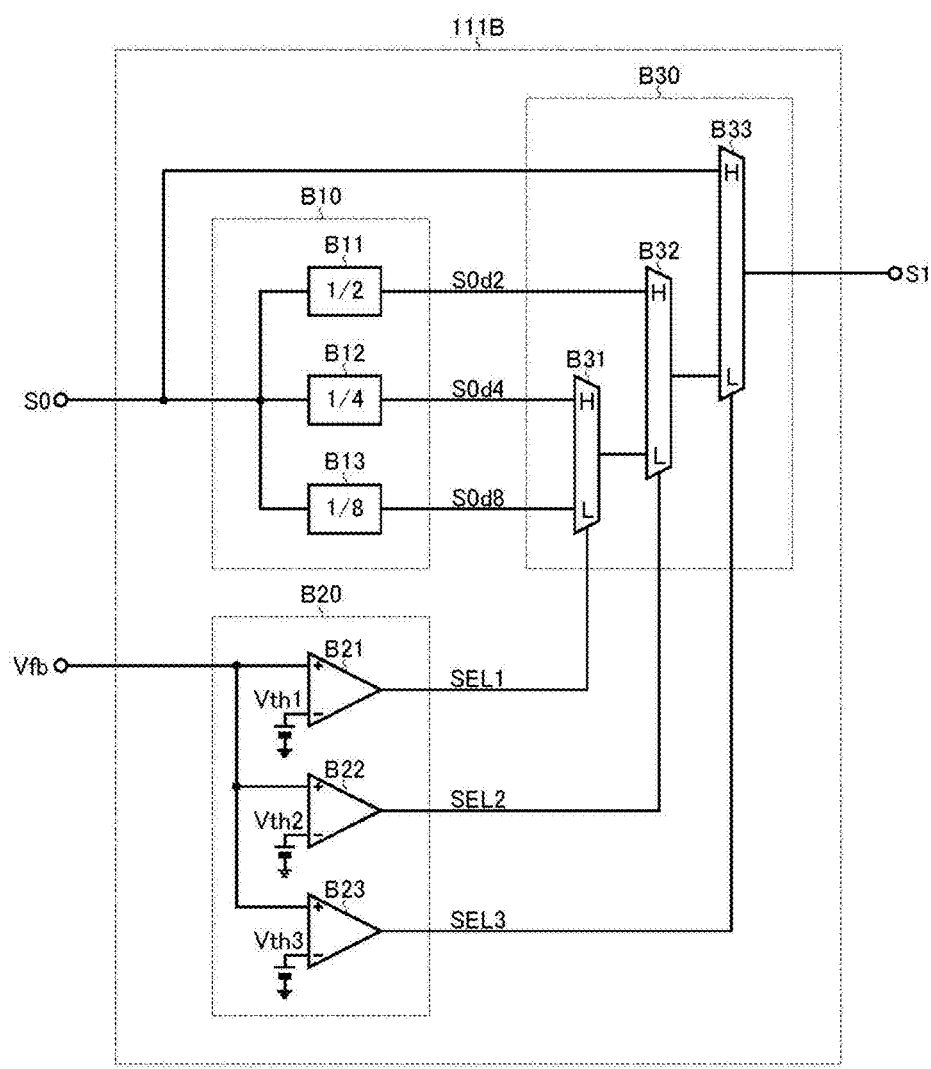
FIG. 12 is a block diagram showing one configuration example of a frequency division circuit.

FIG. 12 is a block diagram showing one configuration example of the frequency division circuit 111B. The frequency division circuit 111B of this configuration example includes a frequency division processor B10, a selection controller B20, and a selection processor B30.

The frequency division processor B10 includes frequency dividers B11 to B13. The frequency division processor B10 divides the frequency of the reference clock signal S0 by mutually different frequency division factors to generate a plurality of frequency-divided clock signals S0$d$2, S0$d$4, and S0$d$8. Specifically, the frequency divider B11 divides the frequency of the reference clock signal S0 by a factor of 2 to generate a frequency-divided clock signal S0$d$2; the frequency divider B12 divides the frequency of the reference clock signal S0 by a factor of 4 to generate a frequency-divided clock signal S0$d$4; and the frequency divider B13 divides the frequency of the reference clock signal S0 by a factor of 8 to generate a frequency-divided clock signal S0$d$8.

The selection controller B20 includes comparators B21 to B23. The selection controller B20 compares the feedback voltage Vfb with mutually different threshold voltages Vth1 to Vth3 (where Vth1<Vth2<Vth3) to generate selection control signals SEL1 to SEL3.

The comparator B21 generates the selection control signal SEL1 by comparing the feedback voltage Vfb input to a non-inverting input terminal (+) of the comparator B21 with the threshold voltage Vth1 input to an inverting input terminal (−) of the comparator B21. The selection control signal SEL1 is at low level when the feedback voltage Vfb is lower than the threshold voltage Vth1, and is at high level when the feedback voltage Vfb is higher than the threshold voltage Vth1.

The comparator B22 generates the selection control signal SEL2 by comparing the feedback voltage Vfb input to a non-inverting input terminal (+) of the comparator B22 with the threshold voltage Vth2 input to an inverting input terminal (−) of the comparator B22. The selection control signal SEL2 is at low level when the feedback voltage Vfb is lower than the threshold voltage Vth2, and is at high level when the feedback voltage Vfb is higher than the threshold voltage Vth2.

The comparator B23 generates the selection control signal SEL3 by comparing the feedback voltage Vfb input to a non-inverting input terminal (+) of the comparator B23 with the threshold voltage Vth3 input to an inverting input terminal (−) of the comparator B23. The selection control signal SEL3 is at low level when the feedback voltage Vfb is lower than the threshold voltage Vth3, and is at high level when the feedback voltage Vfb is higher than the threshold voltage Vth3.

The selection processor B30 includes multiplexers B31 to B33. The selection processor B30 repeats choosing between two, at a time, of the reference clock signal S0 and the frequency-divided clock signals S0d2, S0d4, and S0d8 to eventually select one of them as the ON signal S1.

The multiplexer B31 selectively outputs the frequency-divided clock signal S0d4 when the selection control signal SEL1 is at high level, and selectively outputs the frequency-divided clock signal S0d8 when the selection control signal SEL1 is at low level.

The multiplexer B32 selectively outputs the frequency-divided clock signal S0d2 when the selection control signal SEL2 is at high level, and selectively outputs the output signal of the multiplexer B31 (S0d4 or S0d8) when the selection control signal SEL2 is at low level.

The multiplexer B33 selectively outputs the reference clock signal S0 when the selection control signal SEL3 is at high level, and selectively outputs the output signal of the multiplexer B32 (S0d2, S0d4, or S0d8) when the selection control signal SEL3 is at low level.

Figure 13:
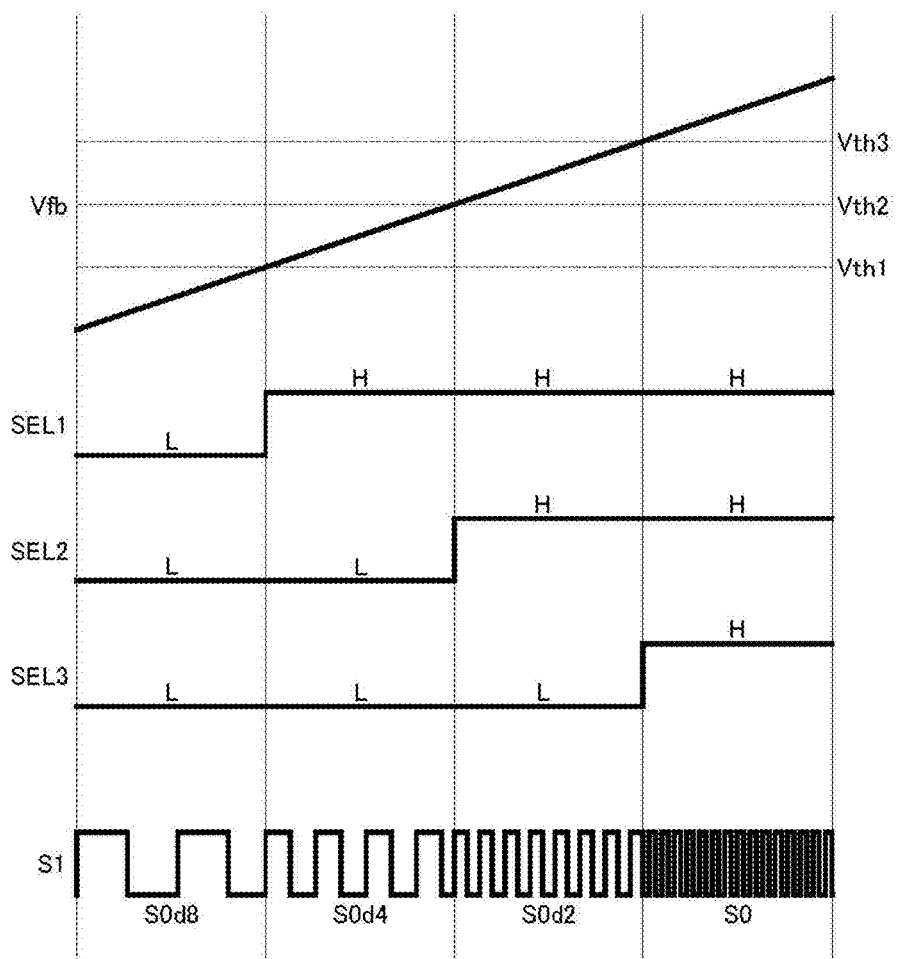
FIG. 13 is a timing chart showing one example of frequency division operation.

FIG. 13 is a timing chart showing one example of frequency division operation, depicting, from top down, the feedback voltage Vfb, the selection control signals SEL1 to SEL3, and the ON signal S1.

When the feedback voltage Vfb is lower than the threshold voltage Vth1, the selection control signals SEL1 to SEL3 are all at low level. Accordingly, as the ON signal S1, the frequency-divided clock signal S0d8 is output.

When the feedback voltage Vfb is higher than the threshold voltage Vth1 but lower than the threshold voltage Vth2, the selection control signal SEL1 is at high level, and the selection control signals SEL2 and SEL3 are at low level. Accordingly, as the ON signal S1, the frequency-divided clock signal S0d4 is output.

When the feedback voltage Vfb is higher than the threshold voltage Vth2 but lower than the threshold voltage Vth3, the selection control signals SEL1 and SEL2 are at high level, and the selection control signal SEL3 is at low level. Accordingly, as the ON signal S1, the frequency-divided clock signal S0d2 is output.

When the feedback voltage Vfb is higher than the threshold voltage Vth3, the selection control signals SEL1 to SEL3 are all at high level. Accordingly, as the ON signal S1, the reference clock signal S0 is output.

In this way, the oscillation circuit 111 is provided with a function of making the switching frequency fsw (=f0/n) of the ON signal S1 the lower the lower the feedback voltage Vfb (hence the output voltage Vout) is.

Figure 14:
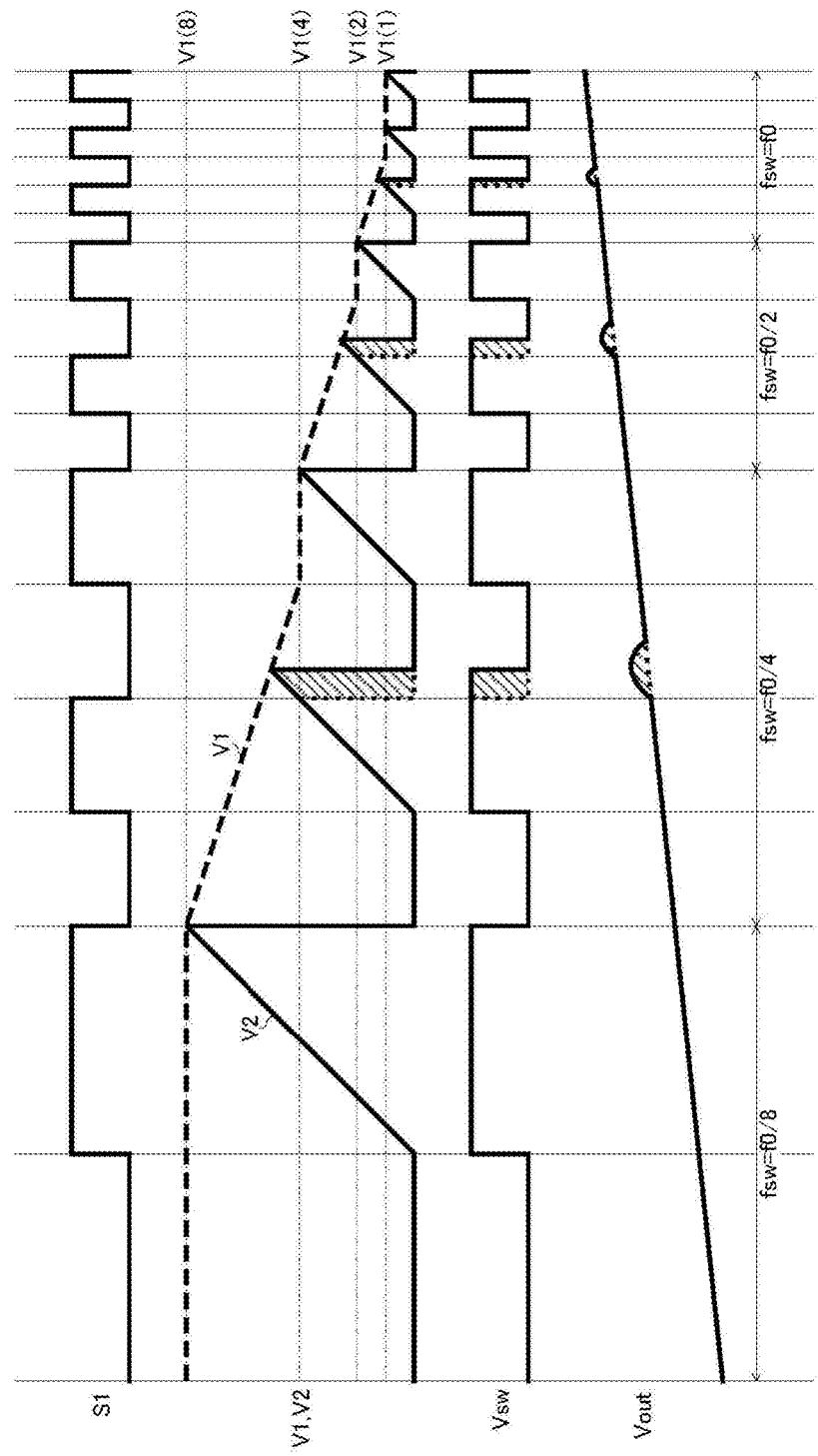
FIG. 14 is a timing chart showing a problem with frequency division operation.

FIG. 14 is a timing chart showing a problem with frequency division operation, depicting the behavior, as observed when the semiconductor device 100 starts up (during the soft-start period), of, from top down, the ON signal S1, the error voltage V1 (broken line), the slope voltage V2 (solid line), the switching voltage Vsw, and the output voltage Vout.

As shown in FIG. 7 referred to previously, in practice, during the soft-start period, the ON-duty Don increases gradually. The following description however assumes, for the sake of simple illustration and description, that in the example shown in FIG. 14, the ON duty Don is fixed to a constant value (here, Don=50%).

When the switching frequency fsw of the ON signal S1 is fixed, the error voltage V1 settles at a voltage commensurate with the switching frequency fsw. Specifically, in the example shown in FIG. 14, when fsw=f0/n (where, n=1, 2, 4, 8), then V1=V1($n$) (=V1(1)×n). As a result, the ON-duty Don is kept at a desired value (50%).

Here, consider a case where the switching frequency fsw of the ON signal S1 is switched from f0/i to f0/j (where i≠j). In this case, if the error voltage V1 switches from V1($i$) to V1($j$) instantaneously, the ON-duty Don is kept constant without deviating from the desired value, and thus no particular problem arises.

However, considering the gain of the error amplifier circuit 110 and phase compensation, it is impossible that the error voltage V1 switches from V1($i$) to V1($j$) instantaneously; in fact, as shown in FIG. 14, it switches from V1($i$) to V1($j$) gently over a predetermined transition period.

Consequently, at the timing that the switching frequency fsw is switched, the timing that the error voltage V1 and slope voltage V2 cross each other occurs later than it should, and the ON-duty Don becomes unnecessarily high, resulting in increased output ripples (the ripple component in the output voltage Vout) (see the hatched regions in FIG. 14).

Here, the larger the amount by which the switching frequency fsw changes, the larger the amount by which the error voltage V1 changes, and thus the larger the increase in the ON-duty Don, and hence the larger the output ripples. One way to suppress output ripples is, as adopted in this embodiment, to increase the number of times that the switching frequency fsw is switched (i.e., the number of times that the frequency of the reference clock signal S0 is divided) and thereby reduce the amount by which the error voltage V1 changes at each timing that the switching frequency fsw is switched.

However, even in this embodiment where the switching frequency fsw is switched in four steps (through division by factors of 8, 4, 2, and 1 (no division)), it is difficult to completely suppress output ripples. Moreover, considering the resulting increase in circuit scale (provision of additional frequency dividers), it is not realistic to increase unboundedly the number of times that the switching frequency fsw is switched.

On the basis of what has been discussed just above, a novel technology will be proposed below which can effectively suppress output ripples without unnecessarily increasing the number of times that the switching frequency fsw is switched.

Figure 15:
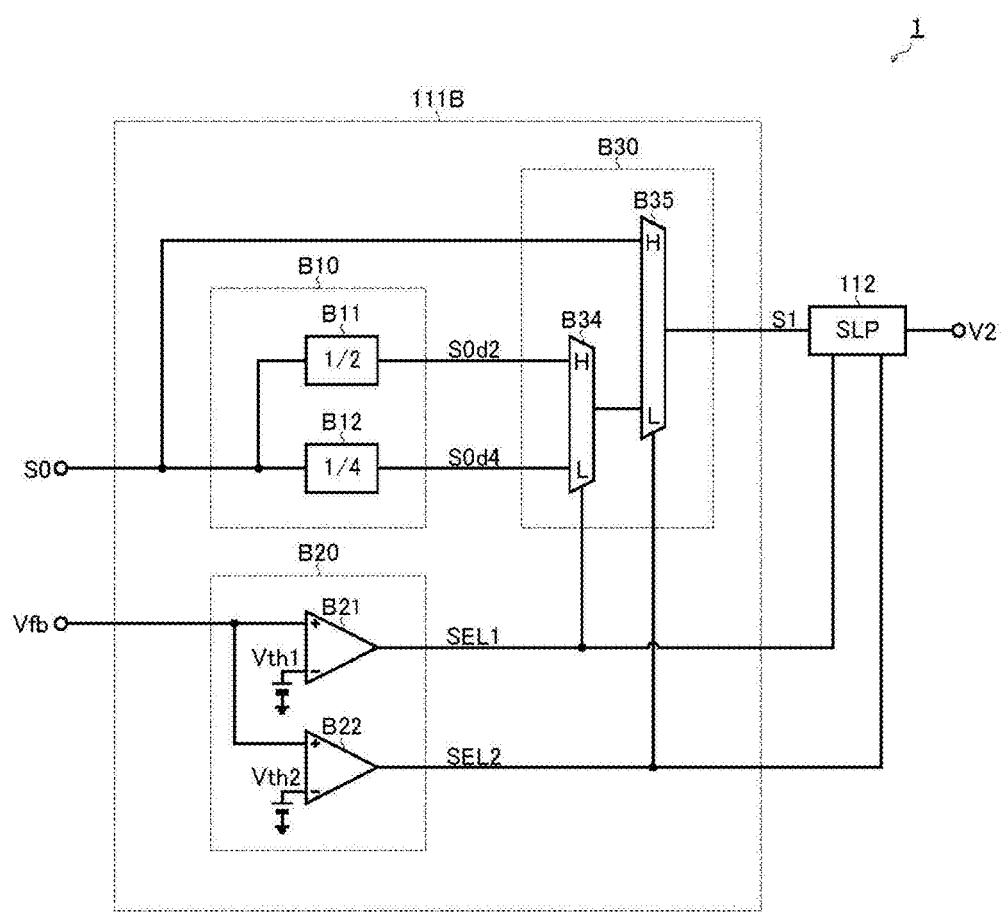
FIG. 15 is a principal-portion block diagram of a second practical example of a switching power supply device.

Second Practical Example:

FIG. 15 is a principal-portion block diagram of a second practical example of the switching power supply device 1. This practical example, based on the basic configuration (FIG. 6) and the first practical example (FIGS. 10 and 12) described previously, has an improved oscillation circuit 111 (an improved frequency division circuit 111B, in particular) and an improved slope voltage generation circuit 112.

Specifically, in the switching power supply device 1 of the second practical example, the frequency division circuit 111B is so configured that the number of times that the switching frequency fsw is switched is reduced from four (division by factors of 8, 4, 2, and 1 (no division)) to three (division by factors of 4, 2, and 1 (no division)) and that the selection control signals SEL1 and SEL2 are output to the slope voltage generation circuit 112.

To adapt to those changes in configuration, in the frequency division circuit 111B, the frequency divider B13 and comparator B23 in FIG. 12 are omitted, and instead of the multiplexers B31 to 33, multiplexers B34 and B35 are provided.

The multiplexer B34 selectively outputs the frequency-divided clock signal S0d2 when the selection control signal SEL1 is at high level, and selectively outputs the frequency-divided clock signal S0d4 when the selection control signal SEL1 is at low level.

The multiplexer B35 selectively outputs the reference clock signal S0 when the selection control signal SEL2 is at high level, and selectively outputs the output signal (S0d2 or S0d4) of the multiplexer B34 when the selection control signal SEL2 is at low level.

Moreover, in the switching power supply device 1 of the second practical example, the slope voltage generation circuit 112 is configured to vary the gradient of the slope voltage V2 according to the selection control signals SEL1 and SEL2.

Figure 16:
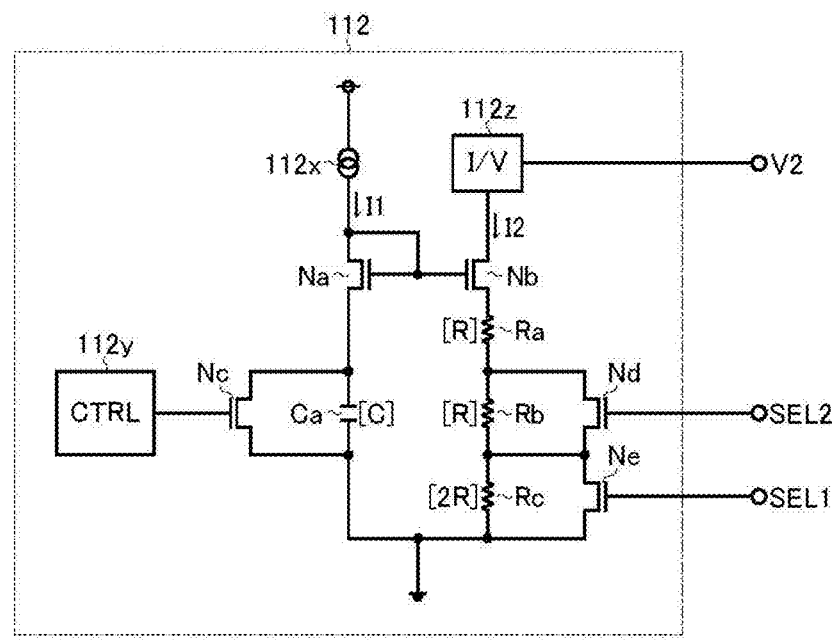
FIG. 16 is a circuit diagram showing one configuration example of a slope voltage generation circuit.

FIG. 16 is a circuit diagram showing one configuration example of the slope voltage generation circuit 112. The slope voltage generation circuit 112 of this configuration example includes a current source 112x, a charge/discharge controller 112y, a current-voltage converter 112z, resistors Ra to Rc, a capacitor Ca, and N-channel MOS field-effect transistors Na to Ne. Although the slope voltage generation circuit 112 includes, in addition to the just enumerated circuit elements, circuit elements for achieving a slope compensation function, these are omitted from illustration for the sake of convenient description.

The transistors Na and Nb correspond to a pair of transistors (a first and a second transistor) that forms a current mirror. Accordingly, a gate of the transistor Na and a gate of the transistor Nb are both connected to a drain of the transistor Na.

The current source 112x is connected between a supplied-power node and the drain of the transistor Na, and generates a predetermined first current I1.

The capacitor Ca (with a capacitance value C) is connected between a source of the transistor Na and a ground node, and is charged and discharged by the first current I1.

The transistor Nc corresponds to a charge/discharge switch that is connected in parallel with the capacitor Ca. When the transistor Nc is OFF, the capacitor Ca is charged by the inductor current IL. On the other hand, when the transistor Nc is ON, the capacitor Ca is short-circuited across it, and is thus discharged.

The charge/discharge controller 112y controls the ON/OFF state of the transistor Nc in synchronism with the switching operation of the switching output stage. For example, the charge/discharge controller 112y can be configured to turn the transistor Nc OFF at a pulse edge in the ON signal S1 and to turn the transistor Nc ON at a pulse edge in the OFF signal S2. For another example, the charge/discharge controller 112y can be configured to turn the transistor Nc OFF at a rising edge in the upper ON/OFF control signal SH and to turn the transistor Nc ON at a falling edge in the upper ON/OFF control signal SH.

The current-voltage converter 112z converts a second current I2 that passes through the drain of the transistor Nb into the slope voltage V2.

A first end of the resistor Ra (with a resistance value R) is connected to a source of the transistor Nb. A second end of the resistor Ra is connected to a first end of the resistor Rb (with a resistance value R). A second end of the resistor Rb is connected to a first end of the resistor Rc (with a resistance value 2R). A second end of the resistor Rc is connected to the ground node.

The transistor Nd is connected to in parallel with the resistor Rb, and is turned ON and OFF according to the selection control signal SEL2. Specifically, the transistor Nd is ON when the selection control signal SEL2 is at high level, and is OFF when the selection control signal SEL2 is at low level.

The transistor Ne is connected in parallel with the resistor Rc, and is turned ON and OFF according to the selection control signal SEL1. Specifically, the transistor Ne is ON when the selection control signal SEL1 is at high level, and is OFF when the selection control signal SEL1 is at low level.

Thus, the resistors Ra to Rc and the transistors Nd and Ne function as a variable resistor with a variable resistance value Rv that varies according to the selection control signals SEL1 and SEL2. Specifically, when the selection control signals SEL1 and SEL2 are both at low level, Rv=4R (=R+R+2R); when the selection control signal SEL1 is at high level and the selection control signal SEL2 is at low level, Rv=2R (=R+R); when the selection control signals SEL1 and SEL2 are both at high level, Rv=R.

Figure 17:
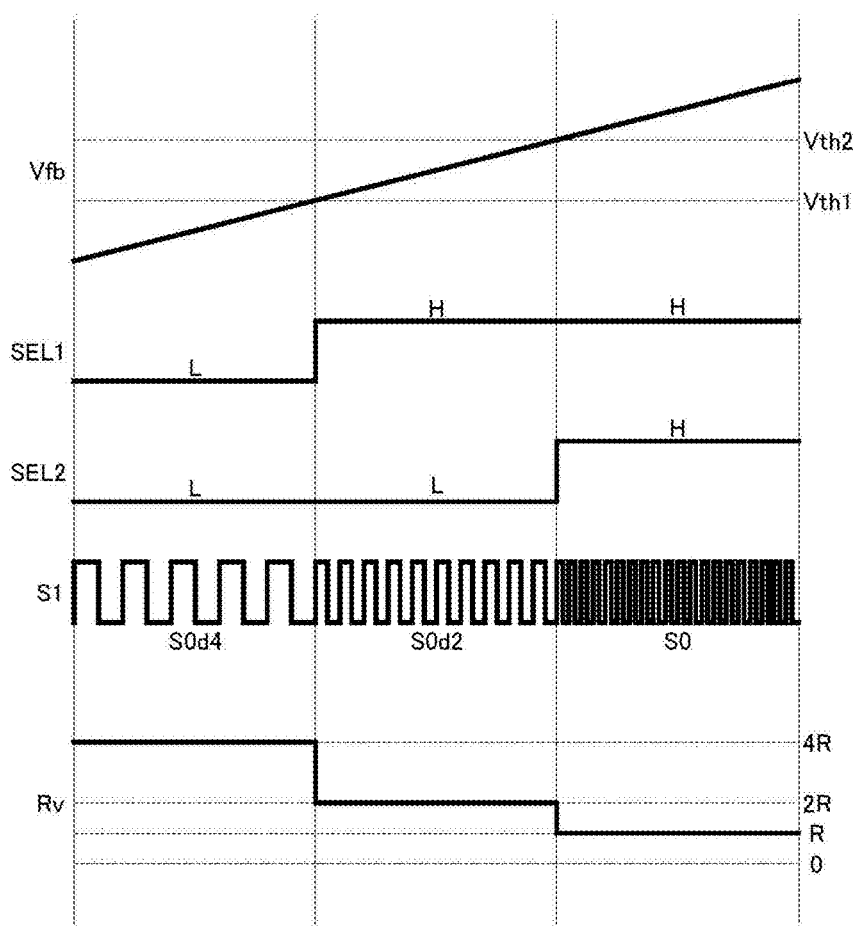
FIG. 17 is a timing chart showing one example of frequency division operation and slope adjustment operation.

FIG. 17 is a timing chart showing one example of frequency division operation and slope adjustment operation, depicting, from top down, the feedback voltage Vfb, the selection control signals SEL1 and SEL2, the ON signal S1, and the variable resistance value Rv.

When the feedback voltage Vfb is lower than the threshold voltage Vth1, the selection control signals SEL1 and SEL2 are both at low level. Accordingly, as the ON signal S1, the frequency-divided clock signal S0d4 (with a frequency of f0/4) is output. At this time, the variable resistance value Rv in the slope voltage generation circuit 112 equals 4R, and thus the current value of the second current I2 is calculated as a function of the charge time t according to formula (1) below (where α=I1/(R×C)).

$$I2=[I1/(4R\times C)]\times t=(\alpha/4)\times t \quad (1)$$

When the feedback voltage Vfb is higher than the threshold voltage Vth1 but lower than the threshold voltage Vth2, the selection control signal SEL1 is at high level and the selection control signal SEL2 is at low level. Accordingly, as the ON signal S1, the frequency-divided clock signal S0d2 (with a frequency of f0/2) is output. At this time, the variable resistance value Rv in the slope voltage generation circuit 112 equals 2R, and thus the current value of the second current I2 is calculated as a function of the charge time t according to formula (2) below.

$$I2=[I1/(2R\times C)]\times t=(\alpha/2)\times t \quad (2)$$

When the feedback voltage Vfb is higher than the threshold voltage Vth2, the selection control signals SEL1 and SEL2 are both at high level. Accordingly, as the ON signal S1, the reference clock signal S0 (with a frequency of f0) is output. At this time, the variable resistance value Rv in the slope voltage generation circuit 112 equals R, and thus the current value of the second current I2 is calculated as a function of the charge time t according to formula (3) below.

$$I2=[I1/(R\times C)]\times t=\alpha\times t \quad (3)$$

As described above, in the switching power supply device 1 of the second practical example, the lower the switching frequency fsw of the ON signal S1, the smaller the gradient of the second current I2. Specifically, when the switching frequency fsw is reduced to 1/n, the gradient of the second current I2 becomes 1/n, and hence the gradient of the slope voltage V2 becomes 1/n.

Figure 18:
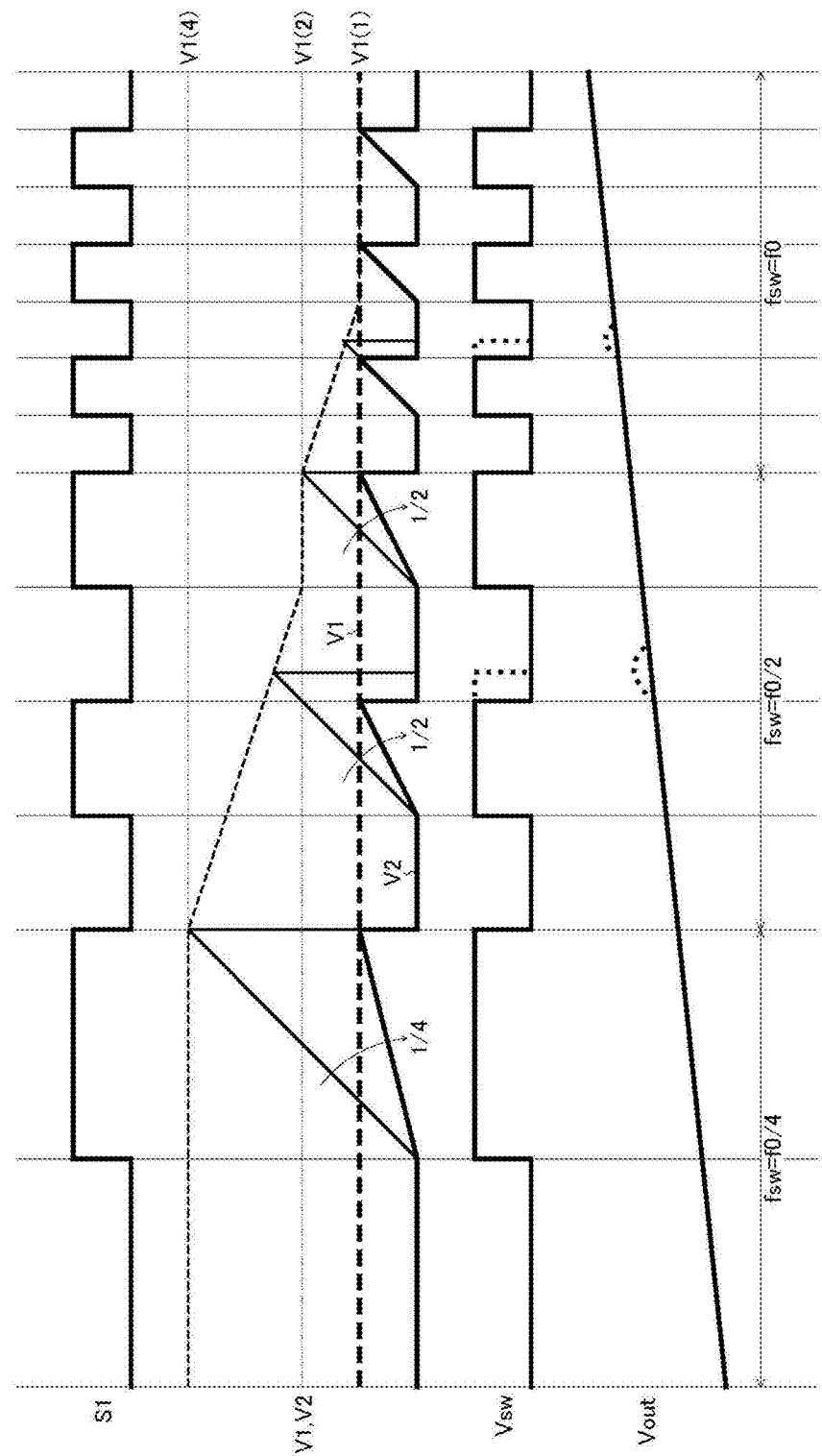
FIG. 18 is a timing chart showing an improved result of output ripples.

FIG. 18 is a timing chart showing an improved result of output ripples, depicting, from top down, the behavior, as observed during start-up of the semiconductor device 100 (during the soft-start period), of the ON signal S1, the error voltage V1 (broken line), the slope voltage V2 (solid line), the switching voltage Vsw, and the output voltage Vout. Also with respect to the example in FIG. 18, as with FIG. 14, the following description assumes that the ON duty Don is fixed to a constant value (Don=50%).

As shown in FIG. 18, when the gradient of the slope voltage V2 without frequency division (fsw=f0) is taken as 1, then the gradient of the slope voltage V2 with frequency division by a factor of 2 (fsw=f0/2) equals ½, and the gradient of the slope voltage V2 with frequency division by a factor of 4 (fsw=f0/4) equals ¼.

By adjusting the gradient of the slope voltage V2 according to the switching frequency fsw in this way, it is possible, even when the switching frequency fsw is switched according to the feedback voltage Vfb, to keep the error voltage V1 at the voltage value V(1) that it has without frequency division (fsw=f0). This eliminates the problem of the timing that the error voltage V1 and the slope voltage V2 cross each other occurring later than it should at the timing that the switching frequency fsw is switched.

Thus, at the timing that the switching frequency fsw is switched, the ON-duty Don is kept constant without deviating from a desired value; this makes it possible to eliminate output ripples, and hence to achieve smooth soft-start operation.

Moreover, with the switching power supply device 1 of the second practical example, even when the number of times that the switching frequency fsw is switched (i.e., the number of times that the reference clock signal S0 is divided) is reduced, output ripples can be suppressed properly. This helps reduce the number of circuit elements (such as frequency dividers and comparators) constituting the frequency division circuit 111B, and thus contributes to size reduction and cost reduction in the switching power supply device 1 (hence in electronic appliances incorporating it).

Figure 19:
FIG. 19 is a timing chart showing a problem with light-load mode transition operation (low duty)
Figure 20:
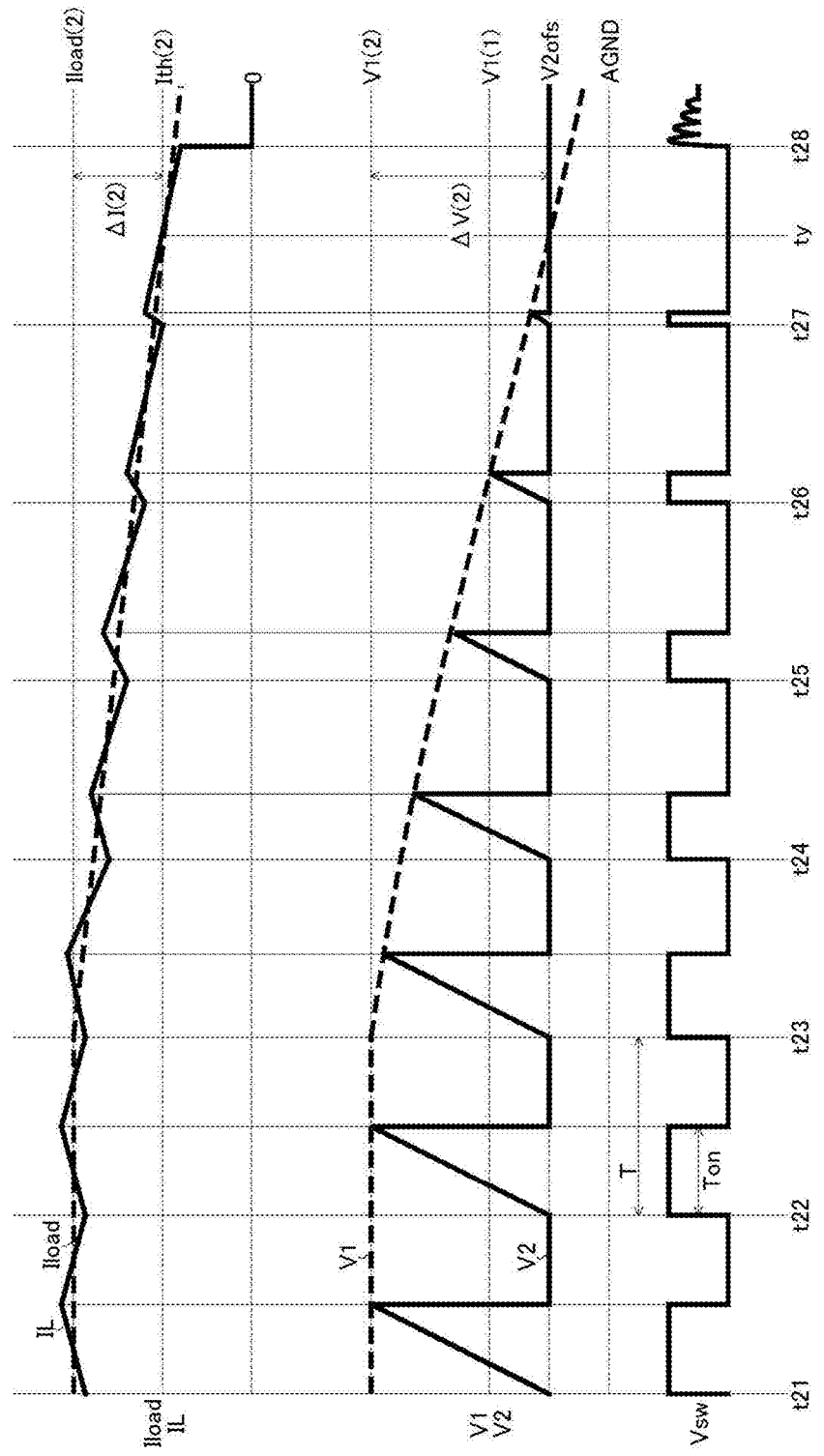
FIG. 20 is a timing chart showing a problem with light-load mode transition operation (high duty)

Light-Load Mode:

FIGS. 19 and 20 are each a timing chart showing a problem with transition to a light-load mode, depicting, from top down, a load current Iload (broken lime), the inductor current IL (solid line), the error voltage V1 (broken line) and the slope voltage V2 (solid line), and the switching voltage Vsw.

FIG. 19 shows behavior with first input/output settings (e.g., Vin=24 V, Vout=1 V) with which the input voltage Vin has to be stepped down greatly to obtain the desired output voltage Vout. On the other hand, FIG. 20 shows behavior with second input/output settings (e.g., Vin=7 V, Vout=5 V) with which the input voltage Vin has to be stepped down only moderately to obtain the desired output voltage Vout.

As shown in FIG. 19, with the first input/output settings, the equilibrium level V1(1) of the error voltage V1 is low, and the timing that the error voltage V1 and the slope voltage V2 cross each other occurs early. Accordingly, the ON-duty Don of the upper transistor 101H (i.e., the proportion of its ON-period Ton in the switching period T) is low (see time points t11 to t13 in FIG. 19).

On the other hand, as shown in FIG. 20, with the second input/output settings, the equilibrium level V1(2) of the error voltage V1 is high, and the timing that the error voltage V1 and the slope voltage V2 cross each other occurs late. Accordingly, the ON-duty Don of the upper transistor 101H is high (see time points t21 to t23 in FIG. 19).

With both the first and second input/output settings, the lighter the load (i.e., the lower the load current Iload), the lower the error voltage V1, and thus the lower the ON-duty of the upper transistor 101H (see time points t13 to t14 in FIG. 19, or time points t23 to t27 in FIG. 20).

Here, the logic circuit 103 described previously is provided with a function of temporarily stopping the operation of the switching output stage when the load current Iload falls below the threshold current Ith so as to achieve higher efficiency under a light load (a so-called light-load mode).

Specifically, at the timing that a pulse is generated in the ON signal S1, if the error voltage V1 is lower than the slope voltage V2 (S2–H), the logic circuit 103 makes a transition into the light-load mode by masking the ON signal S1 by using the OFF signal S2.

For example, as shown in FIG. 19, with the first input/output settings, when, at time point tx, the error voltage V1 falls below an offset level V2ofs of the slope voltage V2, then, after time point tx, the operation of the switching output stage is temporarily stopped (see time points tx to t18 in FIG. 19).

On the other hand, as shown in FIG. 20, with the second input/output settings, when, at time point ty, the error voltage V1 falls below the offset level V2ofs of the slope voltage V2, then, after time point ty, the operation of the switching output stage is temporarily stopped (see time points ty to t28 in FIG. 20).

Incidentally, when a transition into the light-load mode is made, the upper and lower transistors 101H and 101L are both OFF, and this helps suppress unnecessary electric power consumption in the switching power supply device 1.

However, if the offset level V2ofs of the slope voltage is fixed, the voltage difference $\Delta V(*)$ between the equilibrium level $V1(*)$ of the error voltage V1 and the offset level V2ofs of the slope voltage V2 varies greatly, and hence the current difference $\Delta I(*)$ between the load current Iload(*) with the output in equilibrium and the threshold current Ith(*) after a transition into the light-load mode varies greatly (where *=1 or 2; specifically, compare $\Delta V(1)$ in FIG. 19 with $\Delta V(2)$ in FIG. 20, or $\Delta I(1)$ in FIG. 19 with $\Delta I(2)$ in FIG. 20. An improvement plan for overcoming this inconvenience will be proposed below.

Figure 21:
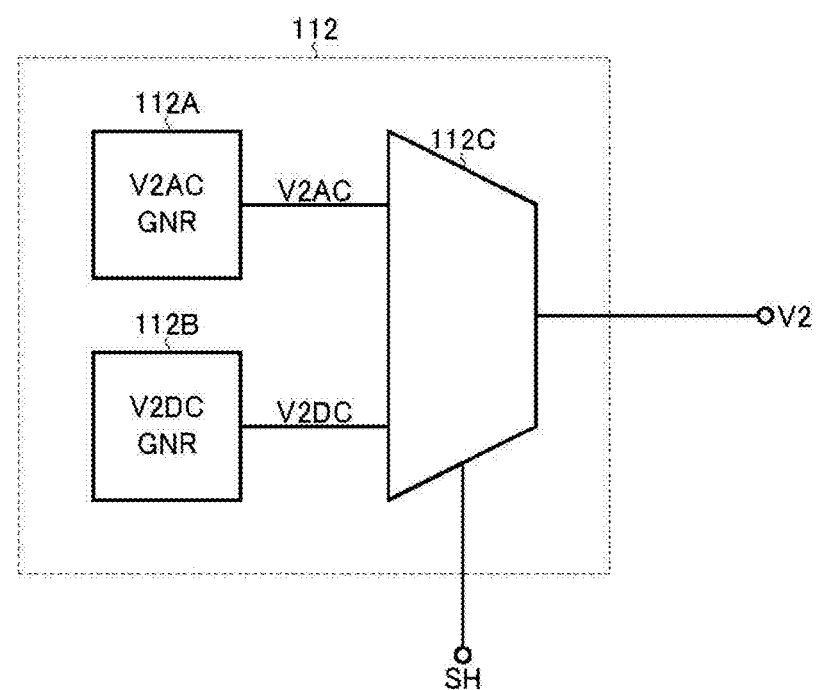
FIG. 21 is a principal-portion block diagram showing one configuration example of a slope voltage generation circuit.

Slope Voltage Generation Circuit:

FIG. 21 is a principal-portion block diagram showing one configuration example of the slope voltage generation circuit 112. The slope voltage generation circuit 112 of this configuration example includes a first voltage generator 112A, a second voltage generator 112B, and a multiplexer 112C.

The first voltage generator 112A generates a first voltage V2AC that rises from a predetermined reset level V2AC(0) with a predetermined gradient. The first voltage generator 112A is provided with a function (slope compensating function) of adjusting the gradient of the first voltage V2AC according to the inductor current IL passing through the switching output stage.

The second voltage generator 112B generates a second voltage V2DC that corresponds to the offset level of the slope voltage V2. The second voltage generator 112B is provided with a function of adjusting the second voltage V2DC so that this voltage follows the equilibrium level of the error voltage V1.

The multiplexer 112C outputs one of the first voltage V2AC and the second voltage V2DC as the slope voltage V2 according to the upper ON/OFF control signal SH. Specifically, the multiplexer 112C outputs the first voltage V2AC as the slope voltage V2 when the upper ON/OFF control signal SH is at high level, and outputs the second voltage V2DC as the slope voltage V2 when the upper ON/OFF control signal SH is at low level.

Figure 22:
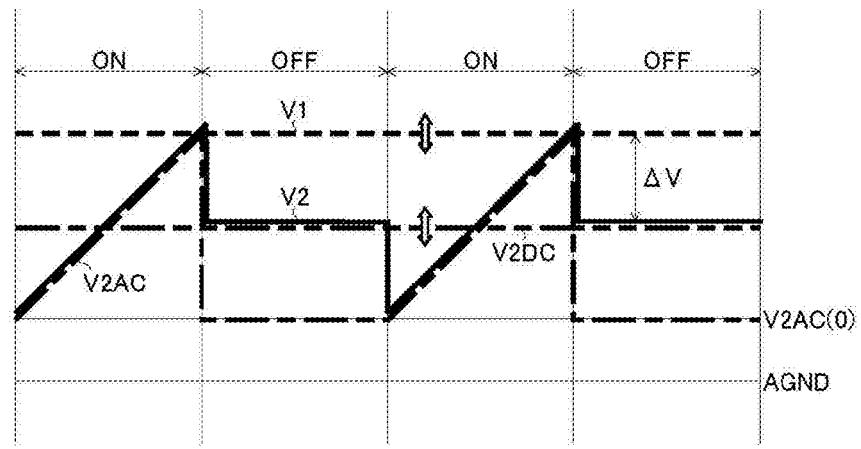
FIG. 22 is a waveform diagram of a slope voltage.

FIG. 22 is a waveform diagram of the slope voltage V2 generated by the slope voltage generation circuit 112 in FIG. 21. There, the broken lime represents the error voltage V1, the solid line represents the slope voltage V2, the dash-and-dot line represents the first voltage V2AC, and the dash-dot-dot line represents the second voltage V2DC.

Through the above-described switching operation by the multiplexer 112C, during the ON-period ON of the upper transistor 101H (the period in which the upper ON/OFF control signal SH is at high level), the first voltage V2AC is output as the slope voltage V2. On the other hand, during the OFF-period of the upper transistor 101H (the period in which the upper ON/OFF control signal SH is at low level), the second voltage V2DC is output as the slope voltage V2.

Accordingly, during the ON-period of the upper transistor 101H, the slope voltage V2 is made to increase from the reset level V2AC(0) with the predetermined gradient, and during the OFF-period of the upper transistor 101H, the slope voltage V2 is kept at the offset level (second voltage V2DC).

The offset level of the slope voltage V2 (i.e., the second voltage V2DC) is so adjusted that the voltage difference ΔV between that level and the equilibrium level of the error voltage V1, which varies according to the input/output settings, is constant all the time. This will be described in detail later.

Figure 23:
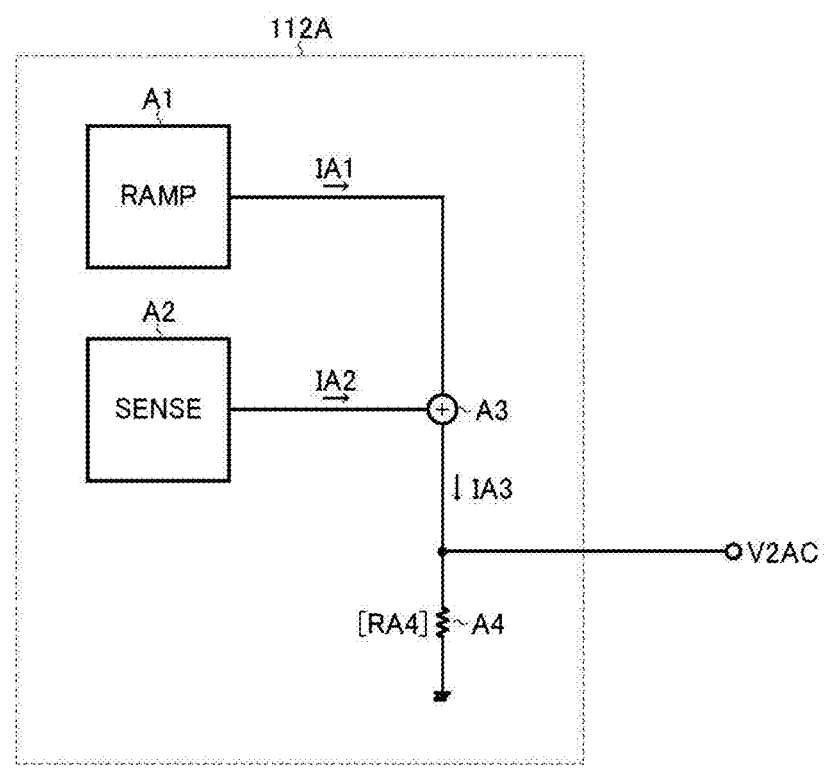
FIG. 23 is a principal-portion block diagram showing one configuration example of a first voltage generator.

First Voltage Generator:

FIG. 23 is a principal-portion block diagram showing one configuration example of the first voltage generator 112A. The first voltage generator 112A of this configuration example includes a ramp current generator A1, a sense current generator A2, an adder A3, and a resistor A4 (with a resistance value RA4).

The ramp current generator A1 generates a ramp current IA1 which increases with a constant gradient during the ON-period of the upper transistor 101H.

The sense current generator A2 generates a sense current IA2 which is commensurate with the magnitude of the inductor current IL passing through the switching output stage. The higher the inductor current IL, the higher the sense current IA2; conversely, the lower the inductor current IL, the lower the sense current IA2

The adder A3 adds up the ramp current IA1 and the sense current IA2 to generate a sum current IA3 (=IA1+IA2).

The resistor A4 functions as a current-voltage conversion element which converts the sum current IA3 into the first voltage V2AC (=IA3×RA4).

In the first voltage generator 112A of this configuration example, the first voltage V2AC has a voltage waveform which is the sum of a ramp waveform with a predetermined gradient (=IA1×RA4) and a sense waveform commensurate with the magnitude of the inductor current IL. Accordingly, the first voltage V2AC is the higher the higher the inductor current IL is, and is the lower the lower the inductor current IL is.

That is, the higher the inductor current IL, the earlier the timing that the error voltage V1 and the slope voltage V2 cross each other, and the lower the ON-duty Don. Thus, feedback acts in such a direction as to decrease the inductor current IL. Conversely, the lower the inductor current IL, the later the timing that the error voltage V1 and the slope voltage V2 cross each other, and the higher the ON-duty Don. Thus, feedback acts in such a direction as to increase the inductor current IL. Through this current mode control, it is possible to enhance the load response of the switching power supply device 1.

Figure 24:
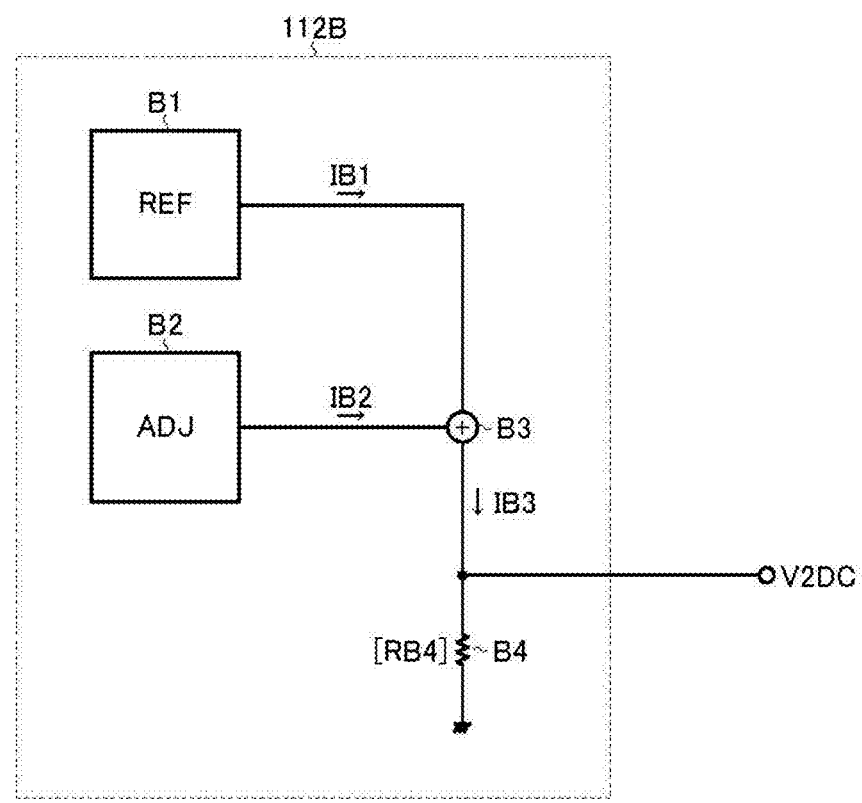
FIG. 24 is a principal-portion block diagram showing a first practical example of a second voltage generator.

Second Voltage Generator (First Practical Example):

FIG. 24 is a principal-portion block diagram showing a first practical example of the second voltage generator 112B. The second voltage generator 112B of this practical example includes a reference current generator B1, an adjustment current generator B2, an adder B3, and a resistor B4.

The reference current generator B1 generates a reference current IB1 which has a constant current value.

The adjustment current generator B2 generates an adjustment current IB2 for adjusting the offset level of the slope voltage V2.

The adder B3 adds up the reference current IB1 and the adjustment current IB2 to generate a sum current IB3 (=IB1+IB2).

The resistor B4 functions as a current-voltage conversion element which converts the sum current IB3 into the second voltage V2DC (=IB3×RB4).

In the second voltage generator 112B of this practical example, the second voltage V2DC has a voltage value which is the sum of the reference voltage with a constant voltage value (=IB1×RB4) and the adjustment voltage with a variable voltage value (=IB2×RB4). Accordingly, the offset level of the slope voltage V2 (i.e., the second voltage V2DC) is the higher the higher the adjustment current IB2 is, and is the lower the lower the adjustment current IB2 is.

Figure 25:
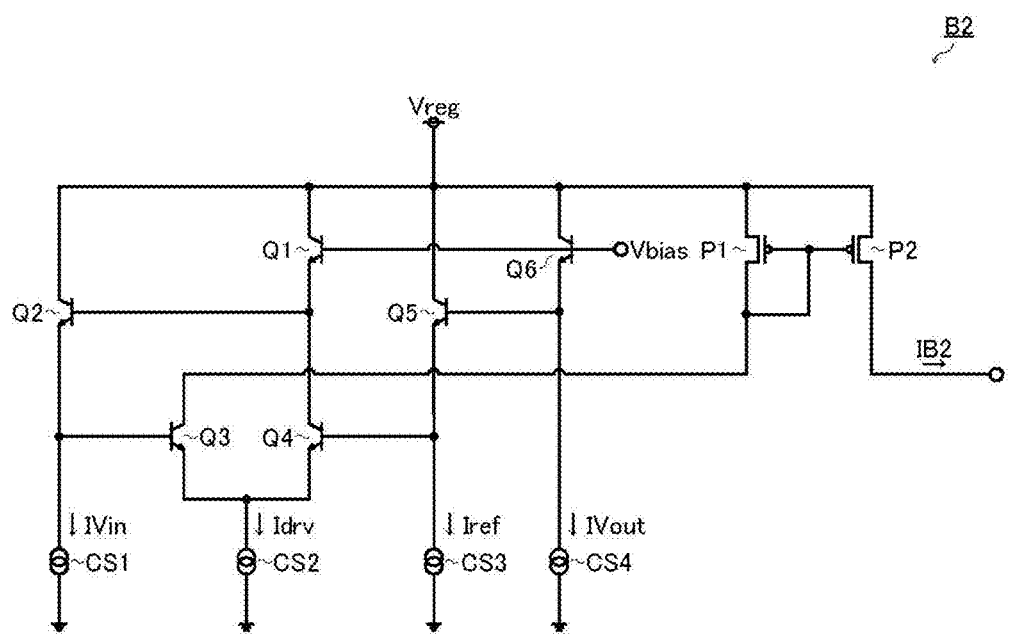
FIG. 25 is a circuit diagram showing one configuration example of an adjustment current generator.

Adjustment Current Generator:

FIG. 25 is a circuit diagram showing one configuration example of the adjustment current generator B2. The adjustment current generator B2 of this configuration example includes npn-type bipolar transistors Q1 to Q6, p-channel MOS field-effect transistors P1 and P2, and current sources CS1 to CS4.

A collector of the first transistor Q1, a collector of the second transistor Q2, a collector of the fifth transistor Q5, and a collector of the sixth transistor Q6 are all connected to an application node of the second constant voltage Vreg. A base of the first transistor Q1 and a base of the sixth transistor Q6 are both connected to an application node of a bias voltage Vbias. A base of the second transistor Q2 and a collector of the fourth transistor Q4 are both connected to an emitter of the first transistor Q1. A base of the fifth transistor Q5 is connected to an emitter of the sixth transistor Q6. A base of the third transistor Q3 is connected to an emitter of the second transistor Q2. A base of the fourth transistor Q4 is connected to an emitter of the fifth transistor Q5. An emitter of the third transistor Q3 and an emitter of the fourth transistor Q4 are connected together.

The current source CS1 is connected between the emitter of the second transistor Q2 and the ground node, and generates a first current IVin. The first current IVin has a current value commensurate with the input voltage Vin (or its standard value). Specifically, the higher the input voltage Vin, the higher the first current IVin, and the lower the input voltage Vin, the lower the first current IVin.

The current source CS2 is connected between the emitters of the transistors Q3 and Q4 and the ground node, and generates a predetermined second current Idrv.

The current source CS3 is connected between the emitter of the fifth transistor Q5 and the ground node, and generates a predetermined third current Iref.

The current source CS4 is connected between the emitter of the sixth transistor Q6 and the ground node, and generates a fourth current IVout. The fourth current IVout has a current value commensurate with the output voltage Vout (or its standard value). Specifically, the higher the output voltage Vout, the higher the fourth current IVout, and the lower the output voltage Vout, the lower the fourth current IVout.

A source of the transistor P1 and a source of the transistor P2 are both connected to an application node of a second constant voltage Vreg. A gate of the transistor P1 and a gate of the transistor P2 are both connected to a drain of the transistor P1. The drain of the transistor P1 is connected to a collector of the third transistor Q3. A drain of the transistor P2 is connected to an output node of the adjustment current IB2.

In the adjustment current generator B2 of this configuration example, assuming that the base-emitter voltages Vbe in the transistors Q1 of Q6 are all equal, the adjustment current IB2 can be expressed by formula (4) below.

$$IB2=Iref \times (IVout/IVin) \qquad (4)$$

As will be understood from formula (4) above, in the second voltage generator 112B, the magnitude of the adjustment current IB2 is varied according to both the input voltage Vin and the output voltage Vout (i.e., the input/output settings), and thereby the second voltage V2DC is adjusted.

Specifically, the higher the input voltage Vin, the lower the adjustment current IB2, and thus the lower the second voltage V2DC. Conversely, the lower the input voltage Vin, the higher the adjustment current IB2, and thus the higher the second voltage V2DC. Moreover, the lower the output voltage Vout, the lower the adjustment current IB2, and thus the lower the second voltage V2DC. Conversely, the higher the output voltage Vout, the higher the adjustment current IB2, and thus the higher the second voltage V2DC.

To summarize what has been discussed above, in the slope voltage generation circuit 112, the lower the ratio of the output voltage Vout to the input voltage Vin (i.e., Vout/Vin), the lower the offset level of the slope voltage V2 (i.e., V2DC) is made; conversely, the higher the ratio of the output voltage Vout to the input voltage Vin, the higher the offset level of the slope voltage V2 is made.

In other words, with such input/output settings that yield a low ON-duty Don, the offset level of the slope voltage V2 is lowered, and conversely with such input/output settings that yield a high ON-duty Don, the offset level of the slope voltage V2 is raised.

Figure 26:
FIG. 26 is a timing chart showing an improvement in light-load mode transition operation (low duty)
Figure 27:
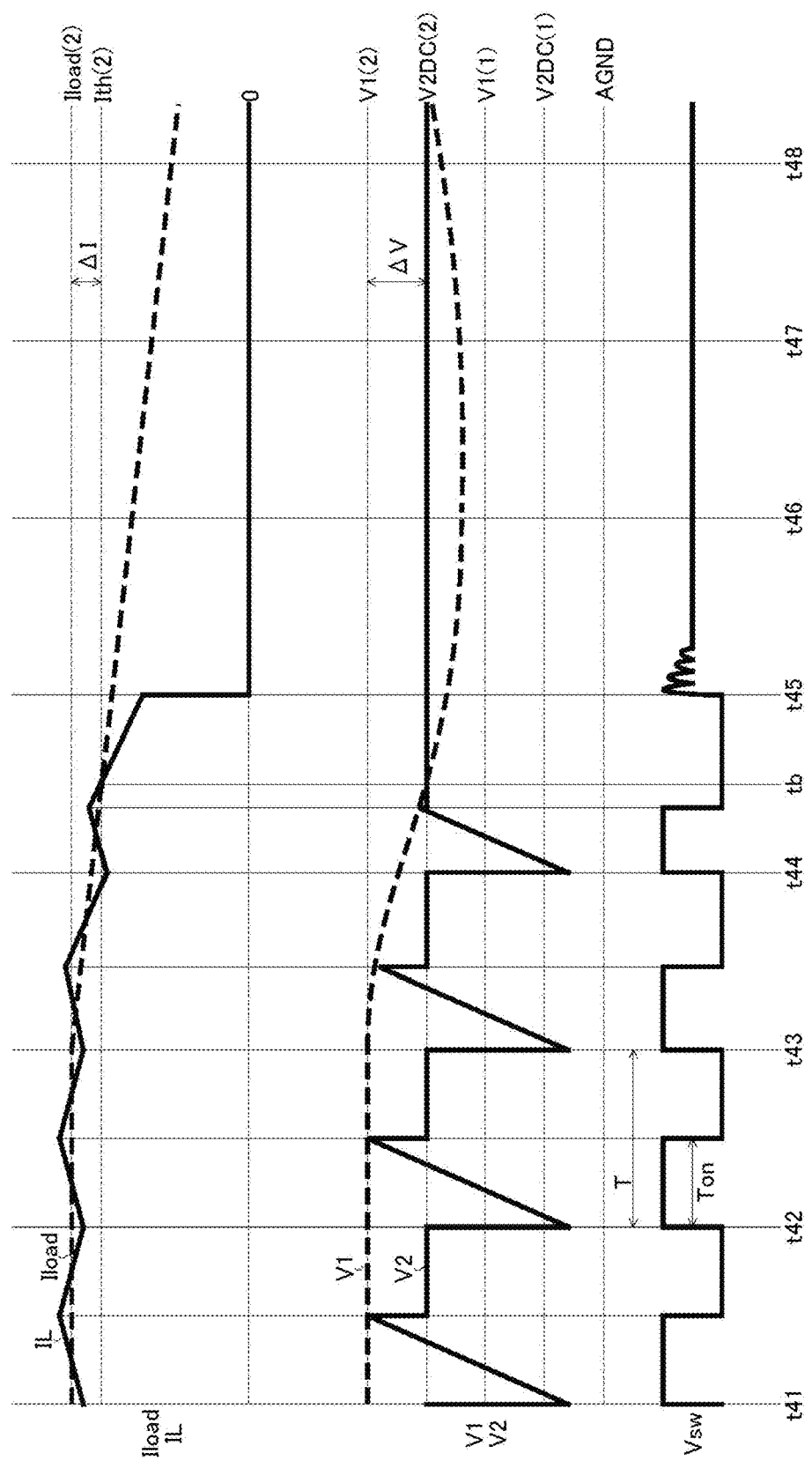
FIG. 27 is a timing chart showing an improvement in light-load mode transition operation (high duty)

FIGS. 26 and 27 are each a timing chart showing an improvement in light-load mode transition operation, depicting, from top down, the load current Iload (broken line) and the inductor current IL (solid line), the error voltage V1 (broken line) and the slope voltage V2 (solid line), and the switching voltage Vsw.

FIG. 26, like FIG. 19 referred to previously, shows behavior with first input/output settings (e.g., Vin=24 V, Vout=1 V) with which the input voltage Vin has to be stepped down greatly to generate the desired output voltage Vout. On the other hand, FIG. 27, like FIG. 20 referred to previously, shows behavior with second input/output settings (e.g., Vin=7 V, Vout=5 V) with which the input voltage Vin has to be stepped down only moderately to obtain the desired output voltage Vout.

As will be understood from FIGS. 26 and 27, in the slope voltage generation circuit 112, through the offset adjustment function described previously, the second voltage V2DC(*) is adjusted such that it follows the equilibrium level V1(*) of the error voltage V1. Specifically, the second voltage V2DC(*) is adjusted automatically such that the voltage difference ΔV between the equilibrium level V1(*) of the error voltage V1 and the offset level of the slope voltage V2 (i.e., the second voltage V2DC(*)) is constant.

For example, as shown in FIG. 26, with the first input/output settings, when, at time point ta, the error voltage V1 falls below the offset level V2DC(1) of the slope voltage V2, then, after time point ta, the operation of the switching output stage is temporarily stopped (see time points ta to t38 in FIG. 26).

On the other hand, as shown in FIG. 27, with the second input/output settings, when, at time point tb, the error voltage V1 falls below the offset level V2DC(2) of the slope voltage V2, then, after time point tb, the operation of the switching output stage is temporarily stopped (see time points tb to t48 in FIG. 27).

With a configuration as described above that adjusts the second voltage V2DC(*) so that it follows the equilibrium level V1(*) of the error voltage V1, it is possible to keep constant the current difference ΔI between the load current Iload(*) with the output in equilibrium and the threshold current Ith(*) after transition into the light-load mode. It is thus possible to enhance the efficiency of the switching power supply device 1 and to easily cope with EMI (electromagnetic interference).

Figure 28:
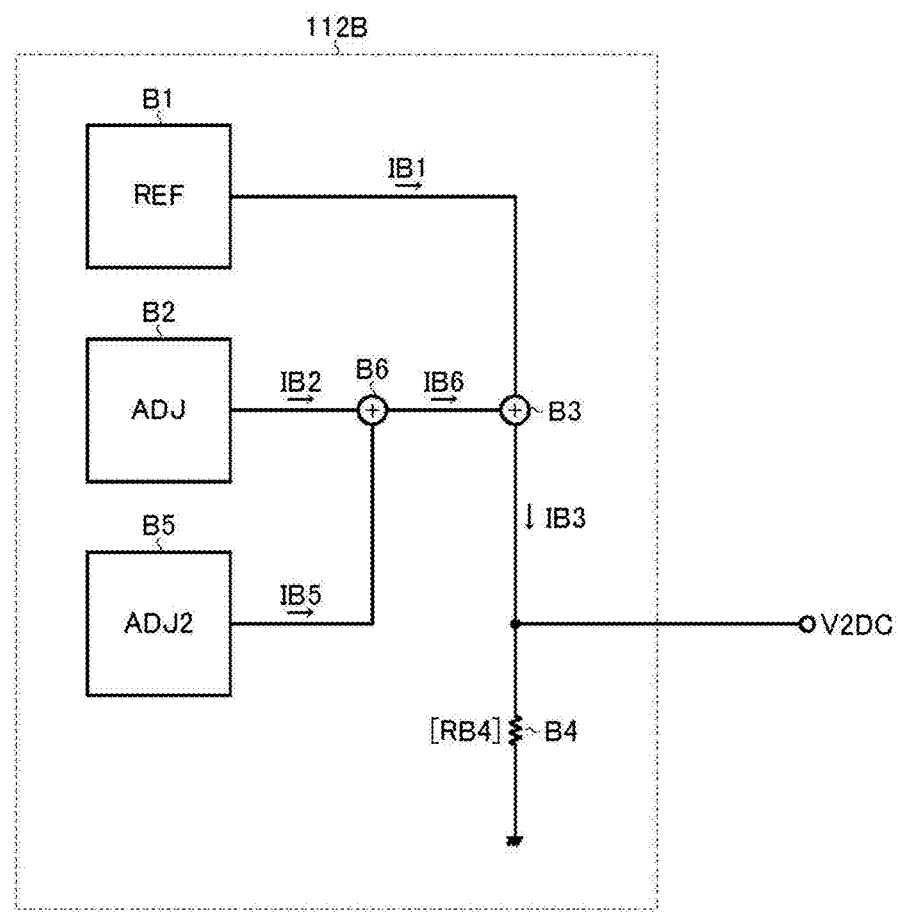
FIG. 28 is a principal-portion block diagram showing a second practical example of a second voltage generator.

Second Voltage Generator (Second Practical Example):

FIG. 28 is a principal-portion block diagram showing a second practical example of the second voltage generator 112B. This practical example, based on the first practical example (FIG. 24) described previously, additionally includes a second adjustment current generator B5 and a second adder B6. Accordingly, such components as find their counterparts in the first practical example are identified by the same reference signs as in FIG. 24, and no overlapping description will be repeated; the following description focuses on the features unique to this practical example.

The second adjustment current generator B5 generates a second adjustment current IB5 for adjusting the offset level of the slope voltage V2 according to the magnitude of the inductor current IL. The higher the inductor current IL, the higher the second adjustment current IB5; conversely, the lower the inductor current IL, the lower the second adjustment current IB5.

The second adder B6 adds up the adjustment current IB2 and the second adjustment current IB5 to generate a sum adjustment current IB6 (=IB2+IB5), and outputs it to the adder B3. Accordingly, the sum current IB3 generated by the adder B3 has a current value which is the sum of the reference current IB1 and the sum adjustment current IB6 (=IB1+IB6=IB1+IB2+IB5).

The second voltage generator 112B of this practical example can not only cancel variation of the equilibrium level of the error voltage V1 but also cancel variation of IL×Ron (where Ron represents the ON-resistance of the upper transistor 101H). Thus, even in the switching power supply device 1, which performs current mode control, it is possible to keep constant the current difference ΔI between the load current Iload(*) with the output in equilibrium and the threshold current Ith(*) after transition into the light-load mode irrespective of the input/output settings (see, for comparison, FIGS. 26 and 27 referred to previously).

Figure 29:
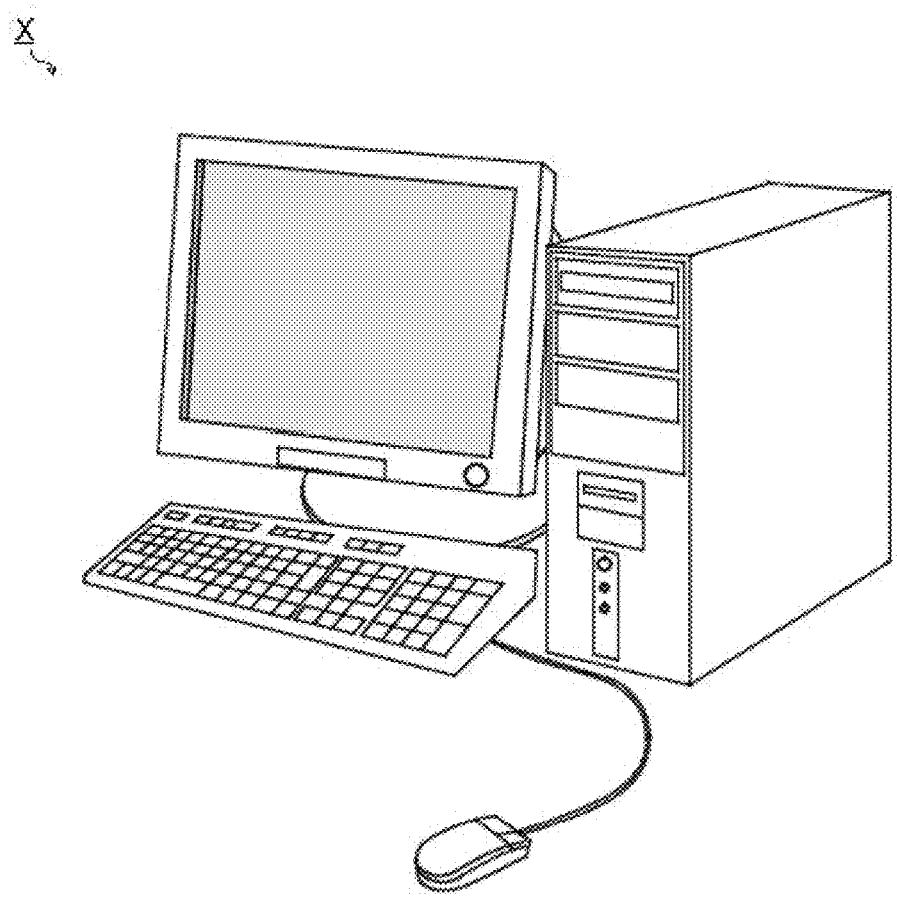
FIG. 29 is an exterior view of a personal computer.

Application to Electronic Appliances:

FIG. 29 is an exterior view of a personal computer. The personal computer X is one example of electronic appliances to which the switching power supply device 1 thus far described is applicable. This, however, is not meant to limit the target for application of the switching power supply device 1; the switching power supply device 1 can be applied to any other electronic appliances.

Other Modifications:

The various technical features disclosed herein may be implemented in any other manners than in the embodiments described above, and allow for many modifications without departing from the spirit of the technical ingenuity of the present invention. For example, wherever possible, bipolar transistors may be replaced with MOS field-effect transistors and vice versa, and the logic levels of signals may be inverted. That is, the embodiments described above should be considered to be in every aspect illustrative and not restrictive, and the technical scope of the present invention should be understood to be defined not by the description of embodiments given above but by the appended claims and to encompass any modifications belonging within the sense and scope of those of the claims.

Synopsis:

To follow is a synopsis of the various embodiments and practical examples disclosed herein.

A DC-DC converter including a soft-start circuit according to the present invention includes a first transistor connected between a high-potential terminal and a first node. It includes a second transistor connected between a low-potential terminal and the first node. It includes a soft-start circuit which generates a soft-start input voltage that increases gradually. It includes an error amplifier which generates an error signal by comparing an output voltage generated at an output terminal based on a voltage at the first node or a feedback voltage having a predetermined relationship with the output voltage with whichever is lower of a reference voltage and the soft-start input voltage. It includes a variable output current generator which receives the soft-start input voltage or a soft-start output voltage having a predetermined relationship with the soft-start input voltage and which generates a variable output current that is proportional to the soft-start input voltage or the soft-start output voltage. It includes a constant-current source which generates a bias current. It includes an oscillator which generates a rectangular-wave signal whose frequency varies linearly with a soft-start current which is the sum of the variable output current and the bias current. It includes a slope circuit which generates a slope signal based on the rectangular-wave signal. It includes a PWM comparator which generates a pulse-width modulated signal based on the error signal and the slope signal. It includes a control circuit which turns ON and OFF the first transistor and the second transistor alternately based on the pulse-width modulated signal. The first and second transistors perform switching operation and thereby convert an input voltage, which is applied to the high-potential terminal, into the output voltage, which is then output from the output terminal, such that the output voltage has a predefined voltage value. (A first configuration.)

Another DC-DC converter including a soft-start circuit according to the present invention includes a first transistor connected between a first node, which is connected to via an inductor to a high-potential terminal, and a low-potential terminal. It includes a second transistor connected between the first node and an output terminal. It includes a soft-start circuit which generates a soft-start input voltage that increases gradually. It includes an error amplifier which generates an error signal by comparing an output voltage at the output terminal or a feedback voltage having a predetermined relationship with the output voltage with whichever is lower of a reference voltage and the soft-start input voltage. It includes a variable output current generator which receives the soft-start input voltage or a soft-start output voltage having a predetermined relationship with the soft-start input voltage and which generates a variable output current that is proportional to the soft-start input voltage or the soft-start output voltage. It includes a constant-current source which generates a bias current. It includes an oscillator which generates a rectangular-wave signal whose frequency varies linearly with a soft-start current which is the sum of the variable output current and the bias current. It includes a slope circuit which generates a slope signal based on the rectangular-wave signal. It includes a PWM comparator which generates a pulse-width modulated signal based on the error signal and the slope signal. It includes a control circuit which turns ON and OFF the first transistor and the second transistor alternately based on the pulse-width modulated signal. The first and second transistors perform switching operation and thereby convert an input voltage, which is applied to the high-potential terminal, into the output voltage, which is then output from the output terminal, such that the output voltage has a predefined voltage value. (A second configuration.)

In either of the DC-DC converters including a soft-start circuit according to the present invention, preferably, when the soft-start input voltage or the soft-start output voltage reaches a predetermined level, the soft-start input voltage or the soft-start output voltage is clamped, and the frequency of the rectangular-wave signal is fixed to a predetermined value according to the predetermined level. (A third configuration.)

In either of the DC-DC converters including a soft-start current according to the present invention, preferably, the oscillator is a ring oscillator or a CR oscillator. (A fourth configuration.)

In either of the DC-DC converters including a soft-start current according to the present invention, preferably, the DC-DC converter is of a current-based control type in which the voltage at the high-potential terminal and the voltage at the first node are applied to the slope circuit and, from the potential difference between the voltage at the high-potential terminal and the voltage at the first node, the current passing through the first transistor is detected. (A fifth configuration.)

In either of the DC-DC converters including a soft-start current according to the present invention, preferably, the DC-DC converter is of a current-based control type in which the voltage at the first node and the voltage at the low-potential terminal are applied to the slope circuit and, from the potential difference between the voltage at the first node and the voltage at the low-potential terminal, the current passing through the first transistor is detected. (A sixth configuration.)

In either of the DC-DC converters including a soft-start current according to the present invention, preferably, the first and second transistors are NMOS transistors. (A seventh configuration.)

In either of the DC-DC converters including a soft-start current according to the present invention, preferably, the first transistor is a PMOS transistor, and the second transistor is an NMOS transistor. (An eighth configuration.)

In either of the DC-DC converters including a soft-start current according to the present invention, preferably, the first and second transistors are bipolar transistors. (A ninth configuration.)

In either of the DC-DC converters including a soft-start current according to the present invention, preferably, there are further provided a first resistor and a second resistor which generate the feedback voltage by dividing the output voltage. (A tenth configuration.)

In either of the DC-DC converters including a soft-start current according to the present invention, preferably, the variable output current generator includes a third transistor which receives the soft-start input voltage or the soft-start output voltage and which generates a current-mirror input current and a current-mirror circuit which converts the current-mirror input current into a current-mirror output current, so that the current-mirror output current is output as the variable output current. (An eleventh configuration.)

A switching power supply device disclosed herein includes: a switching output stage which generates an output voltage by stepping down an input voltage; an error amplifier which receives input of the output voltage or a feedback voltage commensurate therewith and which generates an error voltage; an oscillation circuit which generates an ON signal at a switching frequency; a slope voltage generation circuit which generates a slope voltage in synchronism with the ON signal; a comparison circuit which generates an OFF signal by comparing the error voltage with the slope voltage; a logic circuit which generates an ON/OFF control signal according to the ON signal and the OFF signal; a driver circuit which drives the switching output stage according to the ON/OFF control signal; and an overcurrent protection circuit of a pulse-by-pulse type which forcibly stops the switching operation of the switching output stage on detecting an overcurrent passing through the switching output stage. Here, the oscillation circuit has the function of varying the switching frequency according to the output voltage or the feedback voltage, and the slope voltage generation circuit has the function of varying the gradient of the slope voltage according to the switching frequency. (A twelfth configuration.)

In the switching power supply device of the twelfth configuration described above, preferably, the oscillation circuit makes the switching frequency the lower the lower the output voltage or the feedback voltage is, and the slope voltage generation circuit makes the gradient of the slope voltage smaller the lower the switching frequency is. (A thirteenth configuration.)

In the switching power supply device of the thirteenth configuration described above, preferably, the oscillation circuit includes: a reference oscillation circuit which generates a reference clock signal having a fixed frequency; and a frequency division circuit which generates the ON signal by dividing the frequency of the reference clock signal by a frequency division factor according to the output voltage or the feedback voltage. (A fourteenth configuration.)

In the switching power supply device of the fourteenth configuration described above, preferably, the frequency division circuit includes: a frequency division processor which generates a frequency-divided clock signal by dividing the frequency of the reference clock signal; a selection controller which generates a selection control signal by monitoring the output voltage or the feedback voltage; and a selection processor which selects the reference clock signal or the frequency-divided clock signal as the ON signal. (A fifteenth configuration.)

In the switching power supply device of the fifteenth configuration described above, preferably, the frequency division processor includes a plurality of frequency dividers which generate a plurality of frequency-divided clock signals by dividing the frequency of the reference clock signal by mutually different frequency division factors, the selection controller includes a plurality of comparators which generate a plurality of selection control signals by comparing the output voltage or the feedback voltage with a plurality of mutually different threshold voltages, and the selection processor includes a plurality of multiplexers which output the ON signal through repetition of choice between two, at a time, of the reference clock signal and the frequency-divided clock signals. (A sixteenth configuration.)

In the switching power supply device of the fifteenth or sixteenth configuration described above, preferably, the slope voltage generation circuit varies the gradient of the slope voltage according to the selection control signal. (A seventeenth configuration.)

In the switching power supply device of the seventeenth configuration described above, preferably, the slope voltage generation circuit includes: a first transistor and a second transistor which form a current mirror; a current source which is connected to a first terminal of the first transistor; a capacitor which is connected to a second terminal of the first transistor; a charge/discharge switch which is connected in parallel with the capacitor; a charge/discharge controller which controls the ON/OFF state of the charge/discharge switch; a current-voltage converter which converts the current passing at a first terminal of the second transistor into the slope voltage; and a variable resistor which is connected to a second terminal of the second transistor and whose resistance value varies according to the selection control signal. (An eighteenth configuration.)

In the switching power supply device of any one of the twelfth to eighteenth configurations described above, preferably, there is further provided a soft-start voltage generation circuit which generates a soft-start voltage that increases gently when the switching power supply device starts up, so that the error amplifier generates the error voltage according to the difference between whichever is lower of the feedback voltage and the soft-start voltage and a predetermined reference voltage. (A nineteenth configuration.)

In the switching power supply device of any one of the twelfth to nineteenth configurations described above, preferably, the slope voltage generation circuit further has the function of adjusting the gradient of the slope voltage according to the magnitude of the current passing through the switching output stage. (A twentieth configuration.)

An electronic appliance disclosed herein includes a switching power supply device of any one of the twelfth to twentieth configurations described above. (A twenty-first configuration.)

A switching power supply device disclosed herein includes: a switching output stage which generates an output voltage from an input voltage by use of an output transistor; an error amplifier which receives input of the output voltage or a feedback voltage commensurate therewith and which generates an error voltage; an oscillation circuit which generates a pulse in an ON signal at a predetermined switching frequency; a slope voltage generation circuit which generates a slope voltage in synchronism with the ON signal; a comparison circuit which generates an OFF signal by comparing the error voltage with the slope voltage; a logic circuit which generates an ON/OFF control signal according to the ON signal and the OFF signal; and a driver circuit which drives the switching output stage according to the ON/OFF control signal. Here, the slope voltage generation circuit adjusts the offset level of the slope voltage such that the slope voltage follows the equilibrium level of the error voltage. (A twenty-second configuration.)

In the switching power supply device of the twenty-second configuration described above, preferably, the slope voltage generation circuit adjusts the offset level of the slope voltage such that the difference between the equilibrium level of the error voltage and the offset level of the slope voltage is constant irrespective of input/output settings. (A twenty-third configuration.)

In the switching power supply device of the twenty-third configuration described above, preferably, the slope voltage generation circuit adjusts the offset level of the slope voltage according to both the input voltage and the output voltage. (A twenty-fourth configuration.)

In the switching power supply device of the twenty-fourth configuration described above, preferably, the slope voltage generation circuit makes the offset level of the slope voltage the lower the lower the ratio of the output voltage to the input voltage is, and makes the offset level of the slope voltage the higher the higher the ratio of the output voltage to the input voltage is. (A twenty-fifth configuration.)

In the switching power supply device of any one the twenty-second to twenty-fifth configurations described above, preferably, the slope voltage generation circuit makes the slope voltage increase from a predetermined reset level with a predetermined gradient during the ON-period of the output transistor, and keeps the slope voltage at the offset level during the OFF-period of the output transistor. (A twenty-sixth configuration.)

In the switching power supply device of any one the twenty-second to twenty-sixth configurations described above, preferably, the slope voltage generation circuit adjusts the gradient of the slope voltage according to the magnitude of the current passing through the switching output stage. (A twenty-seventh configuration.)

In the switching power supply device of the twenty-seventh configuration described above, preferably, the slope voltage generation circuit adjusts the offset level of the slope voltage according to the magnitude of the current passing through the switching output stage. (A twenty-eighths configuration.)

In the switching power supply device of the twenty-sixth configuration described above, preferably, the slope voltage generation circuit includes: a first voltage generator which generates a first voltage that increases from the reset level with a predetermined gradient; a second voltage generator which generates a second voltage that corresponds to the offset level; and a multiplexer which outputs one of the first and second voltages as the slope voltage according to the ON/OFF control signal. (A twenty-ninth configuration.)

In the switching power supply device of any one the twenty-second to twenty-ninth configurations described above, preferably, the logic circuit makes a transition into a light-load mode by masking the pulse in the ON signal by use of the OFF signal when the error voltage is lower than the slope voltage at the timing that the pulse is generated in the ON signal. (A thirtieth configuration.)

An electronic appliance disclosed herein includes a switching power supply device of any one of the twenty-second to thirtieth configurations described above. (A thirty-first configuration.)

INDUSTRIAL APPLICABILITY

The invention disclosed herein finds applications in OA (office automation) appliances, secondary power supplies, power adaptor appliances, communications appliances, etc.

What is claimed is:

1. A DC-DC converter comprising:
a soft-start circuit which generates a soft-start input voltage that increases gradually;
an error amplifier which generates an error signal by comparing an output voltage generated at an output terminal or a feedback voltage having a predetermined relationship with the output voltage with whichever is lower of a reference voltage and the soft-start input voltage;
a variable output current generator which receives the soft-start input voltage or a soft-start output voltage having a predetermined relationship with the soft-start input voltage and which generates a variable output current that is proportional to the soft-start input voltage or the soft-start output voltage;
a constant-current source which generates a bias current;
an oscillator which generates a rectangular-wave signal whose frequency varies linearly with a soft-start current which is a sum of the variable output current and the bias current;
a slope circuit which generates a slope signal based on the rectangular-wave signal;
a PWM comparator which generates a pulse-width modulated signal based on the error signal and the slope signal; and
a control circuit which turns ON and OFF a first transistor and a second transistor alternately based on the pulse-width modulated signal, wherein the first and second transistors perform switching operation and thereby convert an input voltage, which is applied to a high-potential terminal, into the output voltage, which is then output from the output terminal.

2. The DC-DC converter of claim 1, wherein the first transistor is connected between the high-potential terminal and a first node, and the second transistor is connected between a low-potential terminal and the first node.

3. The DC-DC converter of claim 1, wherein the first transistor is connected between a first node, which is connected to via an inductor to the high-potential terminal, and a low-potential terminal, and the second transistor is connected between the first node and the output terminal.

4. The DC-DC converter of claim 1, wherein when the soft-start input voltage or the soft-start output voltage reaches a predetermined level, the soft-start input voltage or the soft-start output voltage is clamped, and the frequency of the rectangular-wave signal is fixed to a predetermined value according to the predetermined level.

5. The DC-DC converter of claim 1, wherein the oscillator is a ring oscillator or a CR oscillator.

6. The DC-DC converter of claim 1, wherein the first and second transistors are NMOS transistors.

7. The DC-DC converter of claim 1, wherein the first transistor is a PMOS transistor, and the second transistor is an NMOS transistor.

8. The DC-DC converter of claim 1, wherein the first and second transistors are bipolar transistors.

9. The DC-DC converter of claim 1, further comprising: a first resistor and a second resistor which generate the feedback voltage by dividing the output voltage.

10. The DC-DC converter of claim 1, wherein the variable output current generator includes: a third transistor which receives the soft-start input voltage or the soft-start output voltage and which generates a current-mirror input current; and a current-mirror circuit which converts the current-mirror input current into a current-mirror output current, and the current-mirror output current is output as the variable output current.

11. The DC-DC converter of claim 2, wherein the DC-DC converter is of a current-based control type in which a voltage at the high-potential terminal and a voltage at the first node are applied to the slope circuit and, from a potential difference between the voltage at the high-potential terminal and the voltage at the first node, a current passing through the first transistor is detected.

12. The DC-DC converter of claim 3, wherein the DC-DC converter is of a current-based control type in which a voltage at the first node and a voltage at the low-potential terminal are applied to the slope circuit and, from a potential difference between the voltage at the first node and the voltage at the low-potential terminal, a current passing through the first transistor is detected.

13. A switching power supply device comprising:
a switching output stage which generates an output voltage by stepping down an input voltage;
an error amplifier which receives input of the output voltage or a feedback voltage commensurate therewith and which generates an error voltage;
an oscillation circuit which generates an ON signal at a switching frequency;
a slope voltage generation circuit which generates a slope voltage in synchronism with the ON signal;
a comparison circuit which generates an OFF signal by comparing the error voltage with the slope voltage;
a logic circuit which generates an ON/OFF control signal according to the ON signal and the OFF signal;
a driver circuit which drives the switching output stage according to the ON/OFF control signal; and
an overcurrent protection circuit of a pulse-by-pulse type, the overcurrent protection circuit forcibly stopping switching operation of the switching output stage on detecting an overcurrent passing through the switching output stage, wherein the oscillation circuit has a function of varying the switching frequency according to the output voltage or the feedback voltage, and the slope voltage generation circuit has a function of varying a gradient of the slope voltage in response to the switching frequency.

14. The switching power supply device of claim 13, wherein the oscillation circuit varies the switching frequency lower according to the output voltage or the feedback voltage which changes lower, and the slope voltage generation circuit makes the gradient of the slope voltage smaller in response to the switching frequency which is varied lower.

15. The switching power supply device of claim 13, further comprising:
a soft-start voltage generation circuit which generates a soft-start voltage that increases gently when the switching power supply device starts up, wherein the error amplifier generates the error voltage according to a difference between whichever is lower of the feedback voltage and the soft-start voltage and a predetermined reference voltage.

16. The switching power supply device of claim 13, wherein the slope voltage generation circuit further has a function of adjusting the gradient of the slope voltage according to magnitude of a current passing through the switching output stage.

17. The switching power supply device of claim 14, wherein the oscillation circuit includes:
a reference oscillation circuit which generates a reference clock signal having a fixed frequency; and
a frequency division circuit which generates the ON signal by dividing a frequency of the reference clock signal by a frequency division factor according to the output voltage or the feedback voltage.

18. The switching power supply device of claim 17, wherein the frequency division circuit includes:

a frequency division processor which generates a frequency-divided clock signal by dividing the frequency of the reference clock signal;
a selection controller which generates a selection control signal by monitoring the output voltage or the feedback voltage; and
a selection processor which selects the reference clock signal or the frequency-divided clock signal as the ON signal.

19. The switching power supply device of claim 18, wherein the frequency division processor includes a plurality of frequency dividers which generate a plurality of frequency-divided clock signals by dividing the frequency of the reference clock signal by mutually different frequency division factors, the selection controller includes a plurality of comparators which generate a plurality of selection control signals by comparing the output voltage or the feedback voltage with a plurality of mutually different threshold voltages, and the selection processor includes a plurality of multiplexers which output the ON signal through repetition of choice between two, at a time, of the reference clock signal and the frequency-divided clock signals.

20. The switching power supply device of claim 18, wherein the slope voltage generation circuit varies the gradient of the slope voltage according to the selection control signal.

21. The switching power supply device of claim 20, wherein the slope voltage generation circuit includes:
a first transistor and a second transistor which form a current mirror;
a current source which is connected to a first terminal of the first transistor;
a capacitor which is connected to a second terminal of the first transistor;
a charge/discharge switch which is connected in parallel with the capacitor;
a charge/discharge controller which controls an ON/OFF state of the charge/discharge switch;
a current-voltage converter which converts a current passing at a first terminal of the second transistor into the slope voltage; and
a variable resistor which is connected to a second terminal of the second transistor and whose resistance value varies according to the selection control signal.

22. An electronic appliance comprising a switching power supply device, wherein the switching power supply device includes:
a switching output stage which generates an output voltage by stepping down an input voltage;
an error amplifier which receives input of the output voltage or a feedback voltage commensurate therewith and which generates an error voltage;
an oscillation circuit which generates an ON signal at a switching frequency;
a slope voltage generation circuit which generates a slope voltage in synchronism with the ON signal;
a comparison circuit which generates an OFF signal by comparing the error voltage with the slope voltage;
a logic circuit which generates an ON/OFF control signal according to the ON signal and the OFF signal;
a driver circuit which drives the switching output stage according to the ON/OFF control signal; and
an overcurrent protection circuit of a pulse-by-pulse type, the overcurrent protection circuit forcibly stopping switching operation of the switching output stage on detecting an overcurrent passing through the switching output stage, the oscillation circuit has a function of varying the switching frequency according to the output voltage or the feedback voltage, and the slope voltage generation circuit has a function of varying a gradient of the slope voltage in response to the switching frequency.

23. A switching power supply device comprising:
a switching output stage which generates an output voltage from an input voltage by use of an output transistor;
an error amplifier which receives input of the output voltage or a feedback voltage commensurate therewith and which generates an error voltage;
an oscillation circuit which generates a pulse in an ON signal at a predetermined switching frequency;
a slope voltage generation circuit which generates a slope voltage in synchronism with the ON signal, the slope voltage generation circuit generating the slope voltage with an offset;
a comparison circuit which generates an OFF signal by comparing the error voltage with the slope voltage;
a logic circuit which generates an ON/OFF control signal according to the ON signal and the OFF signal; and
a driver circuit which drives the switching output stage according to the ON/OFF control signal, wherein the slope voltage generation circuit adjusts a level of the level of the slope voltage such that the slope voltage follows an equilibrium level of the error voltage.

24. The switching power supply device of claim 23, wherein the slope voltage generation circuit adjusts the level of the offset of the slope voltage such that a difference between the equilibrium level of the error voltage and the level of the offset of the slope voltage is constant irrespective of input/output settings.

25. The switching power supply device of claim 23, wherein the slope voltage generation circuit makes the slope voltage increase from a predetermined reset level with a predetermined gradient during an ON-period of the output transistor, and keeps the slope voltage at the offset during an OFF-period of the output transistor.

26. The switching power supply device of claim 23, wherein the slope voltage generation circuit adjusts a gradient of the slope voltage according to magnitude of a current passing through the switching output stage.

27. The switching power supply device of claim 23, wherein the logic circuit makes a transition into a light-load mode by masking the pulse in the ON signal by use of the OFF signal when the error voltage is lower than the slope voltage at a timing that the pulse is generated in the ON signal.

28. The switching power supply device of claim 24, wherein the slope voltage generation circuit adjusts the level of the offset of the slope voltage according to both the input voltage and the output voltage.

29. The switching power supply device of claim 24, wherein the slope voltage generation circuit makes the level of the offset of the slope voltage lower according to a ratio of the output voltage to the input voltage which changes lower, and makes the level of the offset of the slope voltage higher according to the ratio of the output voltage to the input voltage which changes higher.

30. The switching power supply device of claim 25, wherein the slope voltage generation circuit includes:
a first voltage generator which generates a first voltage that increases from the reset level with a predetermined gradient;
a second voltage generator which generates a second voltage that corresponds to the offset level; and
a multiplexer which outputs one of the first and second voltages as the slope voltage according to the ON/OFF control signal.

31. The switching power supply device of claim 26, wherein the slope voltage generation circuit adjusts the level of the offset of the slope voltage according to magnitude of a current passing through the switching output stage.

32. An electronic appliance comprising a switching power supply device, wherein the switching power supply device includes:
a switching output stage which generates an output voltage from an input voltage by use of an output transistor;
an error amplifier which receives input of the output voltage or a feedback voltage commensurate therewith and which generates an error voltage;
an oscillation circuit which generates a pulse in an ON signal at a predetermined switching frequency;
a slope voltage generation circuit which generates a slope voltage in synchronism with the ON signal, the slope voltage generation circuit generating the slope voltage with an offset;
a comparison circuit which generates an OFF signal by comparing the error voltage with the slope voltage;
a logic circuit which generates an ON/OFF control signal according to the ON signal and the OFF signal; and
a driver circuit which drives the switching output stage according to the ON/OFF control signal, and the slope voltage generation circuit adjusts a level of the offset of the slope voltage such that the slope voltage follows an equilibrium level of the error voltage.

* * * * *